Dec. 6, 1955 L. L. VERKUIL 2,726,381

ALARM SIGNAL STATION

Filed April 23, 1952 5 Sheets-Sheet 1

INVENTOR
LEO L. VERKUIL

BY William T. Kriesmer
ATTORNEY

INVENTOR
LEO L. VERKUIL
BY William T Kuesner
ATTORNEY

Dec. 6, 1955 L. L. VERKUIL 2,726,381

ALARM SIGNAL STATION

Filed April 23, 1952 5 Sheets-Sheet 3

INVENTOR
LEO L. VERKUIL

BY William T Kuerner
ATTORNEY

Dec. 6, 1955 L. L. VERKUIL 2,726,381

ALARM SIGNAL STATION

Filed April 23, 1952 5 Sheets-Sheet 4

INVENTOR
LEO L. VERKUIL
BY William T. Kreuser
ATTORNEY

Fig. 29.
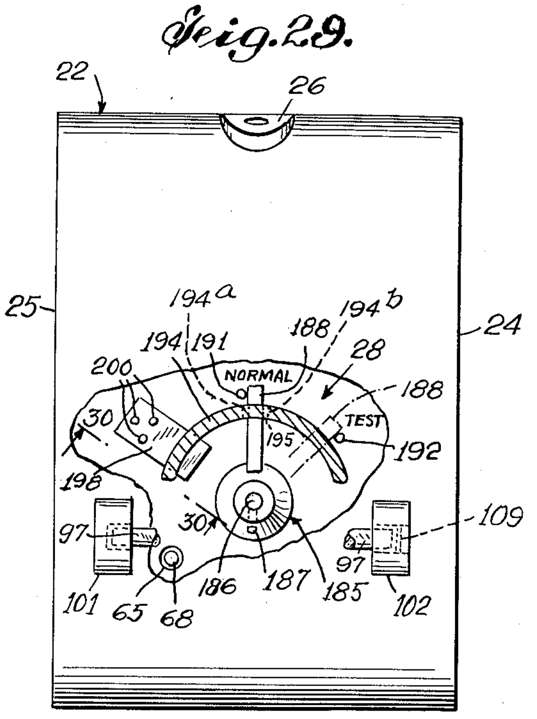
Fig. 28.
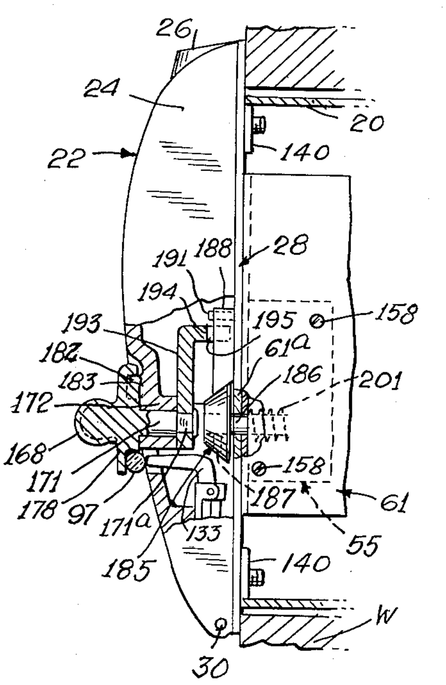
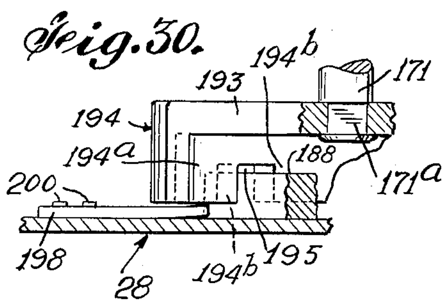
Fig. 31.
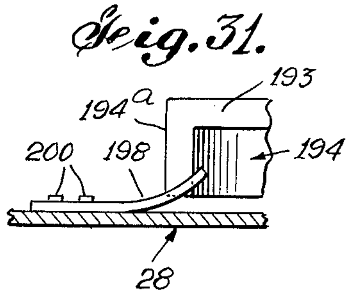
INVENTOR
LEO L. VERKUIL
BY
William T. Kuesner
ATTORNEY United States Patent Office 2,726,381

Patented Dec. 6, 1955

2,726,381

ALARM SIGNAL STATION

Leo L. Verkuil, Norwalk, Conn., assignor to Edwards Company, Inc., Norwalk, Conn., a corporation of New York Application April 23, 1952, Serial No. 283,935

41 Claims. (Cl. 340—308)

This invention relates to signalling apparatus of the fire alarm or call station type.

One of the objects of this invention is to provide a signalling apparatus or station of the so-called non-coded kind that will be dependable and foolproof in actuation and manual control for purposes of transmitting signals, restoring the apparatus or station to normal, and for test purposes. Another object is to provide a signalling station for manual actuation so constructed and operated that the manual actuator once actuated cannot be restored to its normal condition or position excepting upon gaining access to the interior of the station, as by opening it by someone in authority, and cannot be restored or closed against interior access unless all actuated parts are first restored to normal. Another object is to provide a signalling station of the just mentioned kind which is so constructed and manually actuatable for test or alarm drill exercise as to greatly simplify such test operations without risk of setting off the main or city alarm signal system and so that once the station has been used for test or drill purposes, it cannot be restored to alarm signalling condition unless all of its controls are first restored to normal. Another object is to provide a fire alarm signalling station in which externally accessible and internally actuatable devices are so mechanically interlocked that selectivity of actuation as, for example, between alarm signalling and test or drill actuation is dependably assured. Another object is to carry out the just mentioned object by an apparatus and mechanism that will be simple to manipulate and that embodies dependable and inexpensively constructed interlocks that coact to make the signalling apparatus or station substantially foolproof.

Another object is to provide a signalling apparatus of the above mentioned nature constructed in a manner to have wide adaptability to meet varying requirements of practical use and yet dependably maintain ease and facility of fabrication and ease and compactness of assembly and installation. Another object is to provide an alarm signalling station in the form of sub-assemblies or sub-units constructed for facility of fabrication and assembly and for ease and facility of ultimate installation. Another object is to simplify the production of individual parts and apparatus of the above mentioned type and to expedite and facilitate their assembly into coacting or cooperating relationships. Another object is to provide an alarm signalling station in which signalling switch mechanism and an externally accessible manual control or actuator therefor and mounting or enclosure means therefor may be efficiently fabricated individually and for purposes of assembly as well as for subsequent selective operation, assembled inexpensively and brought into foolproof coacting relationships in a simple and dependable manner.

Another object is to provide a signalling apparatus of the above mentioned character in which a deterring element such as a frangible member of glass or the like can be replaceably mounted in appropriate coacting relation by means that will be simple and inexpensive to fabricate and that will be dependably foolproof in actual installation and use. Another object is to provide a simple and reliable control for the mounting of a frangible member in such signalling apparatus, constructed to be substantially tamper-proof even though at least in part accessible externally.

Another object is to provide a strong and durable casing-like mounting or enclosure for signalling apparatus of the above mentioned type, with parts thereof constructed and coacting so as to reduce costly machining operations and facilitate manufacture as by molding or die-casting and also to facilitate and expedite assembly thereto of various coacting parts.

Another object is in general to provide an improved signalling apparatus of the above mentioned type that will be well adapted to meet varying requirements and also the conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown a preferred embodiment of the invention and in which similar reference characters refer to similar parts throughout the several views, Figure 1 is a front view of a signalling station as it would appear installed, certain parts being partially broken away to show certain features;

Figures 1, 2, 3, 4, 5:
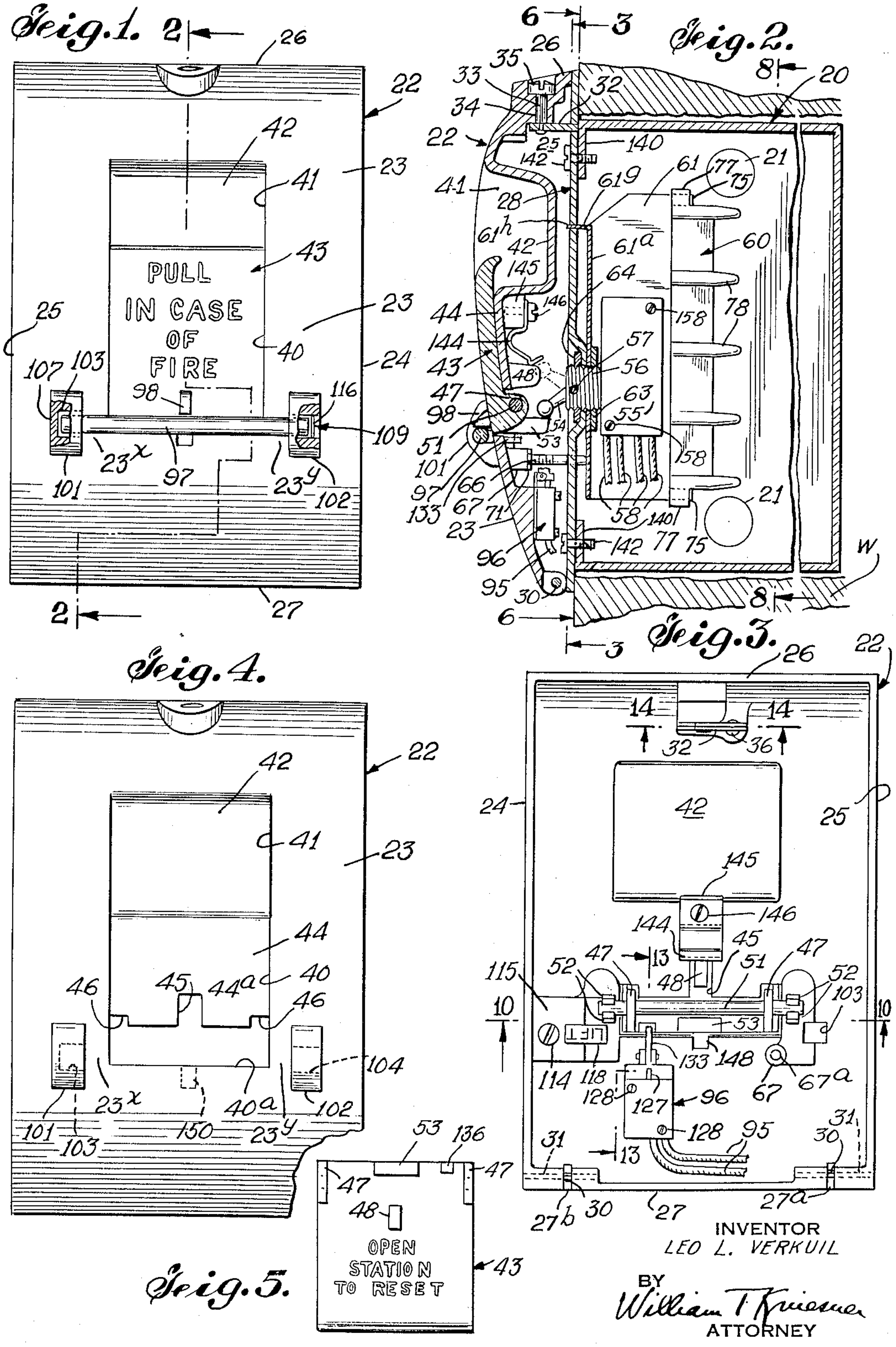
Figure 2 is a vertical sectional view as seen along the line 2—2 of Figure 1.
Figure 3 is a rear elevation as seen along the line 3—3 of Figure 2, showing the movable front portion of the apparatus as it would appear detached from the rest.
Figure 4 is a front elevation of the front casing part as it appears before assemblage thereto of other parts.
Figure 5 is a rear elevation, in inverted position, of a manual actuating lever shown in normal position in front elevation in Figure 1.
Figures 6, 7, 8, 9, 9A, 10, 11, 12, 13:
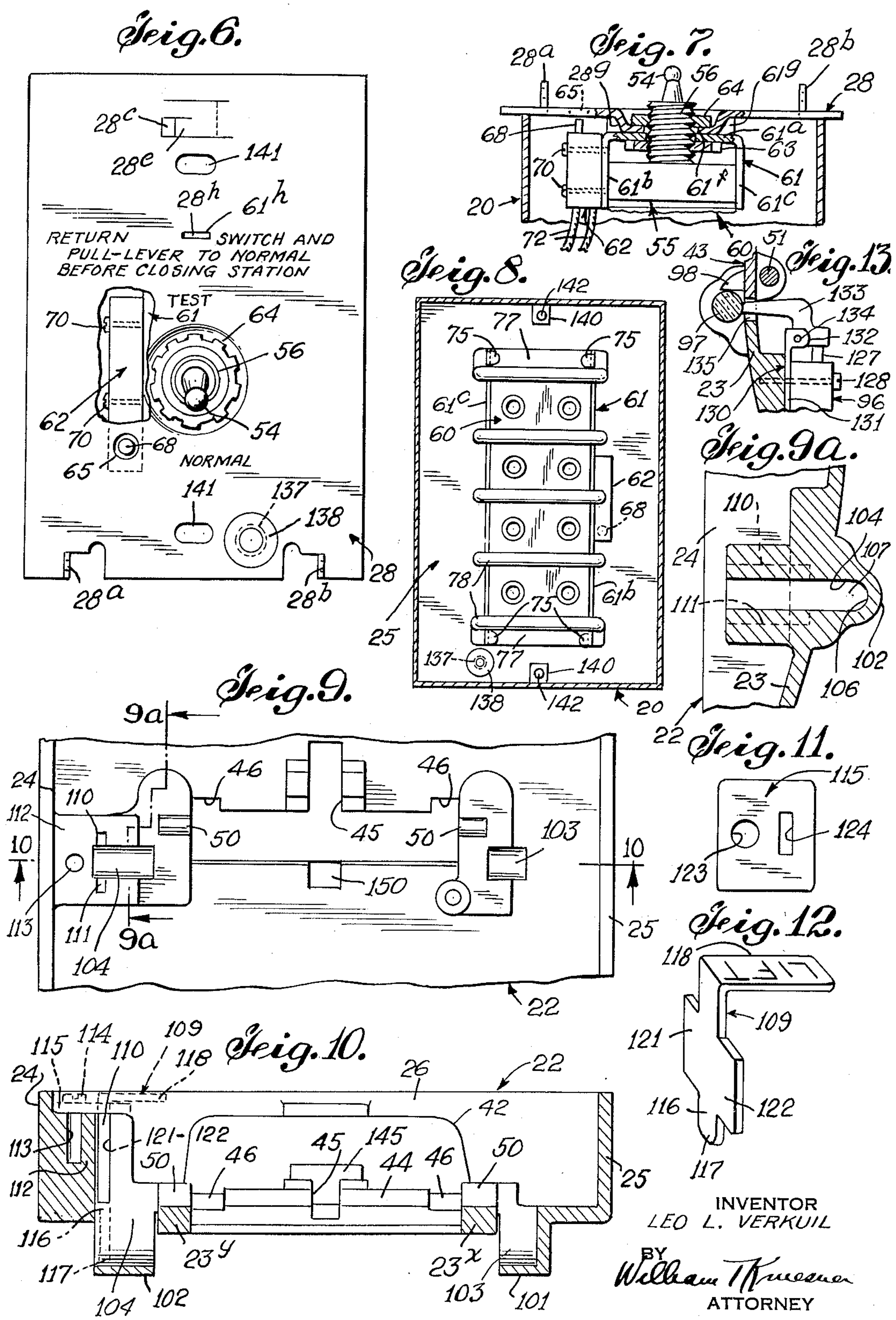
Figure 6 is a front elevation as seen along the line 6—6 of Figure 2, certain parts being omitted or broken away, showing the apparatus substantially as it appears when opened up for test purposes.
Figure 7 is an end elevation as seen from the bottom in Figure 6, certain parts being omitted or broken away or shown in section.
Figure 8 is a vertical sectional view as seen along the line 8—8 of Figure 2.
Figure 9 is a fragmentary large-scale elevation of the front casing part as seen in Figure 3 before the assembly thereto of certain parts.
Figures 15, 16:
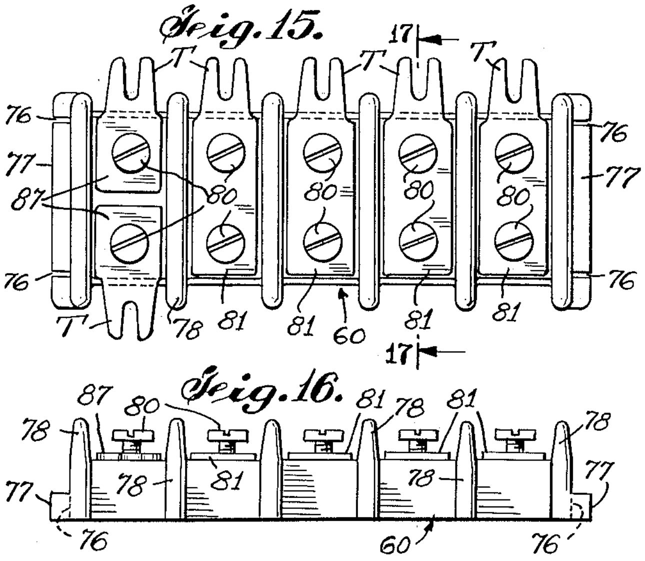
Figures 14, 17:
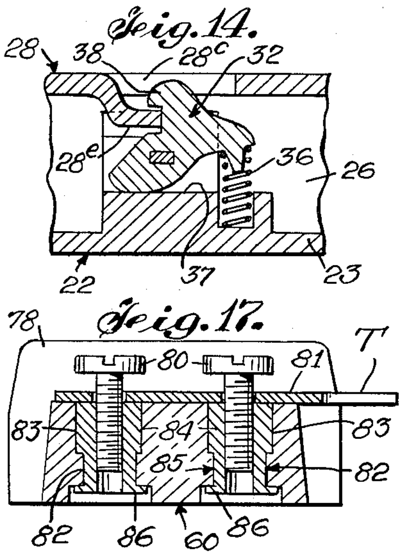
Figures 18, 19, 20, 21, 22, 23:
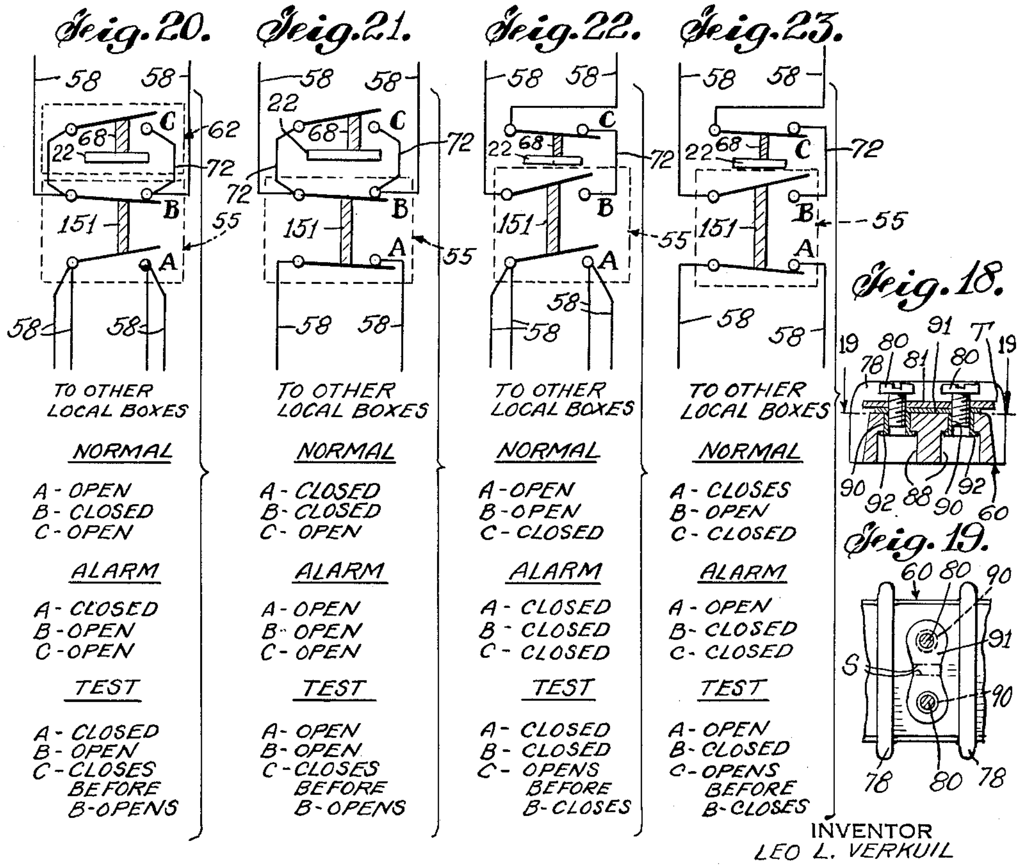
Figure 24:
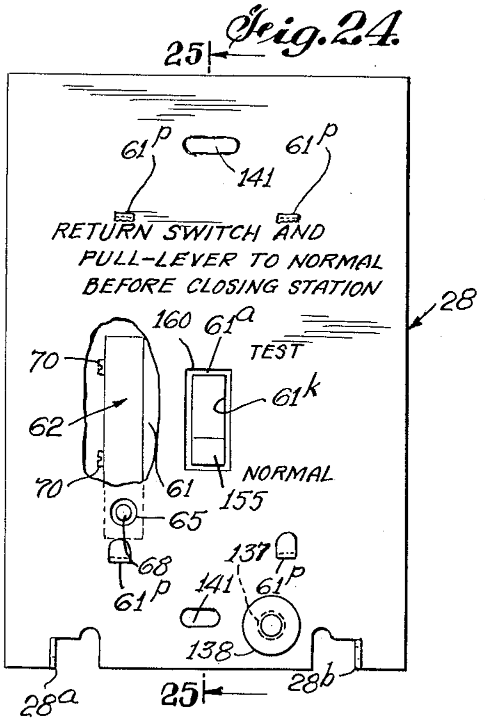
Figure 25:
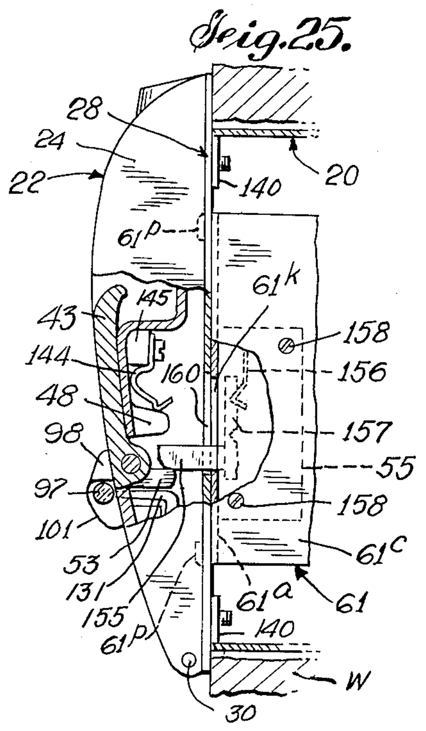
Figure 26:
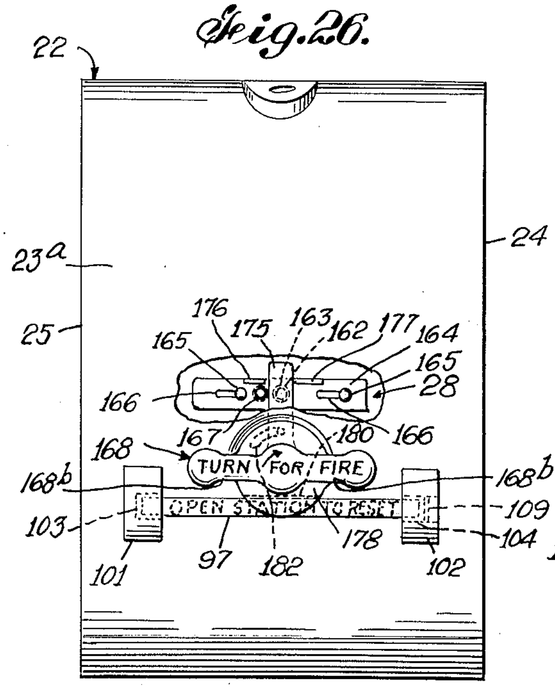
Figure 27:
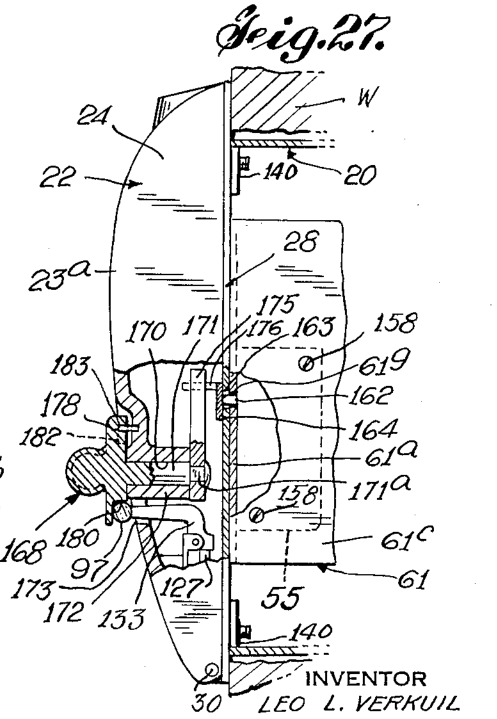

Figure 9ᵃ is a detached fragmentary vertical sectional view as seen along the line 9—9 of Figure 9, showing part of the mount for the frangible member;

Figure 10 is a large-scale horizontal sectional view of the front casing part as seen along the line 10—10 of Figures 9 and 4, showing structural features coacting to mount a frangible member and to mount the manual actuator;

Figure 11 is a larger-scale view of an assembly plate shown in Figure 3 taking part in the assembly of the frangible member and of a control device for the latter;

Figure 12 is a perspective view on a larger scale of a control member for the frangible member;

Figure 13 is a larger-scale fragmentary sectional view as seen along the line 13—13 of Figure 3, showing a switch control correlated with the frangible member;

Figure 14 is a larger-scale transverse sectional view as seen along the line 14—14 of Figure 3, showing part of a locking or latch device for the front cover or casing member;

Figure 15 is a larger-scale plan view of a terminal connector block;

Figure 16 is a front elevation as seen from the front in Figure 15;

Figure 17 is a transverse section as seen along the line 17—17 of Figure 15;

Figure 18 is a similar transverse section as seen along the line 17—17 of Figure 15, showing a modified form of construction;

Figure 19 is a fragmentary elevation as seen along the line 19—19 of Figure 18;

Figures 20–23 are illustrative diagrammatic representations and tabulations of possible electrical and mechanical relationships between certain of the signalling switches;

Figure 24 is a view along the line 6—6 of Figure 2, showing a modification, certain parts being broken away or omitted;

Figure 25 is a side elevation thereof, certain parts being partly broken away or omitted, to show certain parts sectionally and in elevation along the line 25—25 of Figure 24;

Figures 26 and 27 are respectively front and side elevations partially broken away and partially in section, showing another embodiment;

Figures 28 and 29 are respectively side and front elevations partially broken away and partially in section, showing another embodiment; and Figures 30 and 31 are enlarged fragmentary elevations as seen on line 30—30 of Figure 29, showing certain parts in two different conditions of actuation.

Referring first to Figure 2, a casing-like outlet or wall box 20 which may be as small as a standard 4-inch box, is shown mounted by any usual or suitable means to a vertical support, usually a wall W, in which for so-called flush installation of the signalling system the box 20 may be recessed as indicated, being provided with knockouts or the like in its several walls by which conductor or cable-carrying conduit (not shown) may be connected to bring incoming and outgoing conductors into the interior of the box 20 for connection to the signalling apparatus; several such knockouts are indicated at 21. To the front open end of wall box 20 a completely wired-up assembly is secured, ready to have the cable conductors that enter the box 20 electrically connected thereto in a manner later described and comprising relatively movable and mechanically and electrically interlocked parts whereby manual alarm signal actuation is accomplished in a tamper-proof manner and subsequent restoration of the station to normal or non-signalling condition, by someone in authority, may be proceeded with in a simple and foolproof manner. As is later explained, these parts are so interrelated that the internal manual actuator cannot be either repeatedly operated or restored to normal except by gaining access to the interior of the apparatus whereupon the above-mentioned interlocks insure that all actuated parts are first restored to normal before restoring the station to a condition of inaccessibility to its interior.

I provide an outer casing or cover part generally indicated by the reference character 22 which is interiorly relatively shallow (see Figure 2) and which in external configuration as seen in elevation in Figure 1 may be generally rectangular in shape, having a front wall 23 bounded by vertical side walls 24 and 25 and top and bottom walls 26 and 27, these walls 24, 26, 25, and 27 substantially outlining a rectangle as is better seen in Figure 3 which in this illustrative embodiment is of length and breadth greater than that of the front open end of the outlet box 20 (see also Figure 2) and peripherally matching the rectangular shape and dimensions of a coacting carrier or frame plate 28 which can be in the form of a sheet metal stamping as shown in plan in Figure 6. Part 28 and casing part 22 are hingedly connected together preferably to swing about a horizontal axis adjacent the lower coinciding edges of the two parts, the relative pivoting movement between the two coacting with coacting movable parts carried by the two so as to bring about certain mechanical and other interlocking actions as are about to be described.

The pivotal connection between the two may comprise apertured ears 28$^a$ and 28$^b$ (Figures 6 and 7) which are struck up out of sheet metal within the periphery of the plate 28, as is clear from Figures 6 and 7, to be received respectively in slots 27$^a$ and 27$^b$ (see Figure 3) in the bottom wall 27 of front part 22, being pivotally connected together by pivot pins 30, 30 that are passed through holes 31, 31 (Figure 3) that are drilled from the sides and into the thickened slotted portions of the bottom wall 27 as shown in Figure 3.

Suitable means are provided for holding the front part 22 in covering or closing relation to the carrier part 28, such as a latch 32 (Figures 2, 3, and 14) which may be a heavy sheet metal stamping shaped as shown in Figure 14 and provided with a rectangular hole to receive the rectangular shank of a headed stud 33 (see Figure 2) to which the latch 32 is secured as by heading over the reduced inner end of the stud. The stud 33 is rotatably carried in a stepped vertical hole 34 provided in the upper thickened portion of the top wall 26 so that its slotted head 35 is well recessed and out of sight, and yet can be reached with a screwdriver to turn it so as to turn the latch 32 against the action of a spring 36 (Figure 14) one end of which is seated in a recess in the wall 26 and the other end surrounds a centering projection of the latch 32. Normally the spring 36 holds the latch 32 in the position shown in Figure 14, limited by the engagement of a part of the latch against a ledge 37, thus holding the notched head 38 of latch 32 where it takes through a slot 28$^c$ in a raised portion 28$^e$ of the plate 28 (Figures 6 and 14), thus holding the parts 22 and 28 against relative pivoting movement.

The front wall 23 of front part 22 has two portions that are apertured or set back, illustratively in adjacent superimposed four-sided areas forming an aperture 40 of substantial size surmounted by an aperture 41 as seen in Figures 4 and 2. Aperture 41 is walled in by side and back walls 42 (Figure 2), with the four side walls tapering or slightly converging rearwardly or to the right in Figure 2, forming an internal walled-in hand-hole 41 the lower portion of which is closed over by the upper inwardly curved portion of a manual actuating lever 43 that is plate-like in form and substantially rectangular in shape (Figure 1) and which substantially closes over the lower aperture 40 of the front wall 23 which is partially closed off internally by walls 44 integrally formed with the front wall 23 and set back from the latter by an amount equal to the thickness of the hand lever 43 (see Figure 2) so that when the latter rests in home position, against the wall 44, the front face of the lever 43 substantially merges with or is in the same plane as the front face of the front wall 23.

As is better shown in Figure 4, the lower edge 44$^a$ of the internal wall 44, otherwise parallel to the lower edge 40$^a$ of the aperture 40, has a relatively large and deep slot 45 substantially centrally positioned and two smaller slots 46, 46 adjacent the vertical side walls of the aperture 40. The various just-described portions of the front part 22 are shaped so that they can all be formed as by die-casting, as is true also of the plate-like hand lever 43 which is provided with apertured upstanding ears 47, 47 (Figures 5 and 2) and with a centrally positioned relatively large upstanding projection or lug 48 which passes through the slots 46, 46 and 45 when in assembly the plate lever 43 is moved flatwise into the aperture 40 and against the wall 44, thus positioning the projecting lug 48 along the vertical center line of the carrier plate 28 and with its ends spaced therefrom (see Figure 2) and thus also positioning the apertured lever ears 47, 47 substantially in line with half-cylindrical bearing seats 50, 50 cast into the inside face of thickened portions of the front wall 23 (see Figures 9 and 10). Through the lever ears 47, 47 is a shaft or pin 51 (Figures 3 and 2) the ends of which seat in these half-cylindrical bearing seats 50, 50 in which they are held by staking or cold-flowing portions of the metal to either side of each half-cylindrical seat, as indicated at 52 in Figure 3.

The actuating plate lever 43 is thus pivotally mounted in relation to the above described apertures as is better shown in Figure 2 and, at the lower inside edge thereof in that portion that overlies the open space between the edges $44^a$ and $40^a$ in Figure 4, the lever has integrally formed therewith a lug 53 that is shaped and dimensioned substantially as shown in Figures 2 and 5, being aligned along the vertical center line with the projecting lug 48 above described but with the two lugs vertically spaced from each other and each on one side of the pivoting shaft 51. These lugs 48 and 53 coact with a number of parts including a switch operator 54 of a switch unit 55 (Figure 2) carried by the carrier member 28 and constructed in any suitable way so that the switch operator 54 is movable into and out of two positions, a non-signalling position and a signalling position, and illustratively for this purpose the switch unit 55 is of the toggle lever type, in which case the switch operator 54 is in the form of a pivoted lever as shown in Figures 2, 6, and 7, projecting from a threaded sleeve 56 of the switch unit 55 and being pivotally carried for pivoting movement in up and down direction as viewed in Figures 6 and 2, its pivoting pin being indicated at 57 in Figure 2. The internal mechanism of the switch unit 55 need not be shown or described in detail since per se structures of this kind are known and readily available, embodying as is known spring-biased toggle lever mechanisms by which the external toggle lever assumes either of two extreme positions at the limits of its pivoting movement and the internal switching mechanism, which may include controls for more than one circuit, comprises means for interrupting or breaking one or more circuits at either or both internal positions of the parts responsive to the respective positions of the external toggle lever. Moreover, such switch units have the advantage that they are available in quite compact or diminutive form and it is such a small type of unit that I prefer to employ. From the switch unit 55 extend flexible insulated color-coded conductors indicated at 58 and variable in number according to the number of circuits to be controlled and on which stroke of the switch operator 54; illustratively they may be four in number, being internally connected to switch elements according to the needs of the signal system certain illustrative requirements of which are later mentioned. These conductors 58 and conductors from other switching or signal elements later described are permanently connected during manufacture and assembly to an elongated vertically extending terminal connector block 60 of insulating material (Figures 2, 8, and 7) that is carried by a U-shaped sheet metal frame 61 mechanically interrelated for ease and facility of assemblage with both the carrier plate 28 and the switch unit 55 and which coacts to support another switch unit 62 (Figures 6 and 7) which is electrically interlocked with the switching circuits of the switch unit 55 and mechanically interrelated for actuation with the front cover part 22.

U-shaped frame 61 is constructed to be inexpensively stamped and formed out of sheet metal; it has a base plate $61^a$ and two side plates $61^b$ and $61^c$ which are parallel and dimensioned to snugly receive the switch unit 55 therebetween (see Figure 7), the body part of which, usually made of insulating material, is in effect a right-angled parallelopiped with the threaded sleeve 56 thereof projecting centrally from one face. Base plate part $61^a$ (Figure 7) is provided with a round hole $61^f$ through which the threaded sleeve 56 passes after a nut 63 is threaded thereon. Carrier plate 28 is provided with a round hole $28^f$ on its vertical center line in a rearwardly depressed annular portion $28^g$ so that the threaded sleeve 56 can pass through hole $28^f$ and then a spanner nut 64 (Figures 7 and 6) threaded onto it. Nuts 64 and 63 coact to clamp certain parts together.

The base plate part $61^a$ of the U-frame 61 rests against the rearwardly pressed annular portion $28^g$ of the carrier plate 28 and at one end, the upper end in Figure 8, the base part $61^a$ is bent at right angles to form a transverse flange $61^g$ of the same dimension as the extent to which annular part $28^g$ is pressed rearwardly, flange $61^g$ resting against the rear face of carrier plate 28 and thus coacting with the depressed part $28^g$ to hold the flange 61 parallel to the carrier plate 28. Switch unit 55 fitting between the frame side parts $61^b$ and $61^c$ (Figure 7) cannot rotate relative to the frame 61 and the latter is held against rotary displacement about the axis of switch sleeve 56 by a short tongue extension $61^h$ (Figures 6 and 2) of the flange $61^g$ which enters into a correspondingly shaped hole $28^h$ (Figure 6) punched in the carrier plate 28. By this arrangement also the switch unit 62 (Figures 6, 7, and 8) that is carried by frame side part $61^b$ is properly positioned and non-displaceably held in relation to a round hole 65 (Figures 6 and 7) in the carrier plate 28 and in relation to a switch-actuating stem 66 (Figure 2) which is rigidly carried by a cylindrical boss 67 cast integrally with and at the inside face of the front wall 23 of front casing part 22, being of a length to pass through the hole 65 and to engage and depress the spring-opposed plunger 68 that normally projects outwardly from the switch unit 62 (Figure 7) and toward the carrier plate 28; in Figure 7 it is shown in normal projected position under the action of its internal biasing spring, thus holding the internal switch mechanism or switch unit 62 in unactuated condition to effect shift thereof to actuated condition when the plunger 68 is depressed by the actuating stem 66 as a result of swinging the front cover part 22 into closing position relative to the carrier frame 28.

The switch unit 62 may be of the known so-called microswitch type, being quite compact and small and provided with two diagonally opposed holes as indicated in Figures 7 and 8 through which screws 70 pass, threaded into the side part $61^b$ of U-frame 61 to secure it to the latter with the plunger operator 68 spaced from and aligned with the hole 65 in the plate 28, a relationship fixed upon securing the U-frame 61 to the back of plate 28 as above described. Desirably, therefore, operating stem 66 on the hinged front part 22 may be made adjustable in length as by casting the cylindrical post or boss 67 (Figures 2 and 3) with a coaxial hole $67^a$ which may be threaded to adjustably receive the threaded end of rigid stem 66, the latter carrying a lock nut 71 (Figure 2) to lock it in such adjusted position where when the cover part 22 is closed stem 66 passes through the hole 65, engages the switch plunger 68 (Figures 7 and 8), and depresses and holds it depressed to the desired extent to shift and hold the internal shift mechanism to actuated position. As shown in Figure 7, suitable flexible conductors 72 lead from the switch unit 62 for connection to terminals of the terminal connector block 60; these conductors 72 can be two in number where the switch 62 is electrically interrelated with the circuits of main signalling switch 55, as is later illustratively set forth.

As shown in Figure 2, switch unit 55, non-rotatively related to the carrier plate 28 by the U-frame 61 and the rotation-preventing connection $61^h$—$28^h$ (Figures 2 and 6) between the frame 61 and plate 28, is thereby positioned so that the axis 57 of switch lever 54 extends transversely of the line or plane in which lugs 53 and 48 of the signal lever 43 move when the lever is swung about its shaft 51 or as the front cover part 22 is swung about its hinged axis 30. The normal or non-signalling position of switch toggle lever 54 is as shown in Figures 2 and 6, being swung and normally held in downmost position and in that position its ball end rests in the space between lever lugs 53 and 48, just barely contacting the upper face of the lower lever lug 53 (Figure 2), which face when alarm lever 43 is swung counter-clockwise, is of a length sufficient to swing switch toggle lever 54 clockwise beyond its center or dead-center position so as to make sure that switch lever 54 moves completely to its actuated or upwardly swung position shown in dotted lines in Figure 2, lever lug 53 disengaging from and by-passing the switch lever 54 and thereafter serving as a stop to limit the counter-clockwise swing of alarm lever 43 in that lever lug 53, being broader than the slot 45 (compare Figures 5 and 4), comes up against the inside face of wall 44 (Figure 2), in effect bridging the lower portion of slot 45 (Figure 4), whereupon the counter-clockwise swing of alarm lever 43 moves the lever lug 48 to clear the path for the upward snap-acting swing of toggle lever 54 to its final upward actuated position. As is later described, these parts also mechanically coact to block return swing of the alarm lever 43 and to prevent resetting of the entire mechanism in other than the correct relationship of the parts. To faciliate speedy assembly and setting of the pars for these coactions and to compensate for manufacturing tolerances and possible structural differences in certain of the parts, the final location of the switch unit 55 and its toggle switch lever 54 in a direction toward or away from the front cover member 22 as seen in Figure 2 may be determined by setting the inside clamping nut 63 on the threaded sleeve 56 and then tightening up the spanner nut 64 on the front of the carrier plate 28, thereby also clamping the U-frame 61 tightly against the depressed part 28$^g$ (Figure 7) of the plate 28 and thereby also preventing the tongue 61$^h$ (Figures 2 and 6) of the abutting end flange 61$^g$ of the U-frame 61 from dislodging itself from the slot 28$^h$ in the carrier plate 28. As better appears from Figures 2 and 7, the insulating terminal block 60 is spaced sufficiently from the base part 61$^a$ of U-frame 61 to provide for adequate range of adjustable shifting of switch unit 55, horizontal in Figure 2 and vertical in Figure 7, by the clamping nuts 63, 64, as above described.

As shown in Figures 2, 7, and 8, the terminal block 60 is relatively long and narrow and is positioned by the U-frame 61 preferably along the central vertical axis (Figure 8) so that when entered into the conduit box 20 there is ample space left at all sides for the passage of the cable conductors that are entered into the box 20 some or all of which are for connection to the terminal block 60 according to the wiring or system requirements. Terminal block 60 substantially closes over the inner end of the U-frame 61 and is constructed for ease and dependability of assemblage thereto. Referring to Figures 2, 7, and 8, the side plates 61$^b$, 61$^c$ of U-frame 61 terminate in parallel edges against which the bottom face of the insulating terminal block 60 rests, the block being slightly wider than the spacing of the parallel side parts 61$^b$, 61$^c$, these parallel frame edges terminating in integrally formed tabs or ears 75 which are received in end slots 76 (see also Figure 15) formed in end flanges 77, 77 (Figures 15 and 16) of the insulating block 60, the ears 75 of the opposed pairs at the respective ends (see Figure 8) being bent inwardly toward each other and onto these end flanges 77 to clamp the block against the edges of the side parts of the U-frame 61. The interfitting of these ears 75 in the slots 76 dependably holds the insulating block 60 against shift.

The insulating block 60 (Figures 15–19) comprises a molding of suitable insulating material, being shaped as shown in the drawings, including tapered parts and shapes as shown, for ease and simplicity of molding and it is externally divided into transverse areas by a suitable number of integral flanges 78 which project upwardly from the upper face of the block 60 and are continued downwardly along the sides from which they project laterally. Illustratively six such insulating barrier flanges may be employed (see Figures 15 and 16), thus providing five transversely elongated depressed areas in the upper face of the block and, particularly for so-called in-and-out wiring connections for the cable conductors that come into and out of the box 20 of Figure 2, each of these transverse areas is provided with two conductor connecting elements aligned crosswise of the block 60, illustratively taking the form of binding screws 80, and these are made to coact with sheet metal plate elements provided with tabs T (Figure 15) to which the flexible conductors such as conductors 58 and 72 (Figures 2 and 7) and conductors from other signalling devices are permanently connected, as by wrapping, clamping, and soldering. For in-and-out wiring these plate elements may take the form indicated at 81 (Figure 15), being substantially rectangular in shape to fit not too loosely between two adjacent barrier flanges 78, 78, being provided with spaced holes for the passage therethrough of the two spaced binding screws 80, 80, with the tabs T overhanging a side of the insulating block, whence after fastening the flexible conductors thereto the tabs T may be bent downwardly against the side of the block between the lateral barrier portions of the flanges 78, 78. In this manner any flexible conductor from the signalling apparatus that is connected to the tab T of a connector plate 81 can be electrically related to the wiring cable system by having an incoming cable conductor connected to one binding screw 80 and the corresponding or mating outgoing cable conductor connected to the other binding screw 80.

The binding screws 80 are threaded into suitable threaded bushings, one form of which is shown in Figure 17, wherein at each of its transversely divided areas the insulating block is provided with two stepped or shouldered molded holes 82 of which a portion 83 nearest the upper face of the insulating block 60 is hexagonal to receive the externally hexagonal portion 84 of an internally threaded bushing 85 the lowermost end of which is spun over as at 86 to clamp the shouldered wall of the hole 82 between the hexagonal part 84 and the spun-over part 86. At the top surface the bushings are substantially flush and the apertured connector plate 81 can rest in position, and when the screws 80 are tightened up to clamp cable conductors, the latter are interconnected through the connector plate 81 and have the internal signalling apparatus connected thereto at the tabs T. The connector plates 81 are simple stampings of light sheet metal and where the wiring system and signalling device do not require in-and-out wiring connections, two connector plate elements, each shorter than the above-described plate 81, may be employed as shown at 87, 87 in Figure 15, one for each binding screw 80, 80, and with the respective tabs T, T thereof overlapping opposite sides of the block 60 for independent connection thereto of flexible conductors from signalling apparatus, as is illustratively described later.

Another form of mounting for the binding screws 80, 80 is shown in Figures 18 and 19. In each transverse barrier-bounded area of the insulating block 60 the latter is molded to provide two round holes 88, 88 stepped as shown to receive the two spaced tubular parts 90, 90 that are formed or drawn, with suitable axial spacing, out of a single flat sheet metal stamping 91 which rests flatwise against and transversely of the top face of the block 60, with the tubular parts 90, 90 extending into the spaced holes and with their ends spun over as at 92 against an annular shoulder in each hole to clamp each part in position. Each tubular part 90, 90 is internally threaded to receive the binding screws 80, 80, and for in-and-out wiring at the two binding screws the latter are electrically interconnected by the bridging part 91 as well as by the connector plate 81 with tabs T as above described. Where the two binding screws of any transverse section of the connector block are intended for separate circuit connections, the part 91 (see Figure 19) may be provided with score lines S, S along which an intermediate section of the part 91 may be broken out before assemblage to the insulating block 60 itself, thus electrically segregating the two binding screws 80, 80 and their threaded tubular members 90, 90, and in such case two oppositely directed apertured connector plates are employed as at 87, 87 in Figure 15, each with tabs T.

As above noted, the flexible conductors 58 from main signalling switch 55 and conductors 72 from the interlocked switch unit 62 are permanently connected to respective tabs T of appropriate connector plates 81 and 87 prior to assembly of the apparatus to the wall box 20, and the same is true as to the flexible conductors of any other signalling device embodied in the signalling station, such as the two flexible conductors 95 leading from a switch unit 96 arranged to coact with a frangible member 97 carried at the front (see Figure 1) of the station and serving as a deterrent to tampering with the installation. Frangible member 97 is preferably in the form of a glass rod and is replaceably mounted to coact with a breaker lug 98 (Figures 1 and 2) that is moved to break the rod 97 when the alarm lever 43 is actuated, being also preferably so mounted as to coact in holding the alarm lever 43 in its normal or home position.

The front face of the plate-like alarm lever 43 can bear a suitable legend of instruction, by lettering which can be cast into the lever and which can read as indicated in Figure 1, namely, "Pull in Case of Fire," and where the lever 43 is relatively small it is preferred to mount the frangible member 97 in a position where it will be clearly visible and yet not materially obstruct the front face of lever 43, and where the frangible member 97 takes the form of a rod it is preferred to position it adjacent the lower end of the lever, preferably in front of the junction between the lower edge of lever 43 when in home position and the upper edge 40$^a$ of the front aperture shown in Figure 4, and where the pivoting lugs or ears 47, 47 of the lever 43 are located as shown and above described, the just stated preferred position of rod 97 is thus relatively close to the axis of lever 43 and somewhat below it (see Figure 2), thus giving the breaker lug 98 a very short lever arm as compared to the long lever arm through which the fingers of the hand inserted into the hand hole 41 and in back of the upper end of lever 43 (Figure 2), actuate the lever out of home position. Resistance to breakage in thus easily overcome without imposing too much burden on the manual actuation of alarm lever 43.

As above noted, the front part 22 is constructed for facility of casting, as by die-casting, and to replaceably support the frangible member 97 the two separable mold parts, the front mold part of which conforms to the external configuration of part 22 as seen in Figure 4 and the back mold part of which conforms to the internal configuration, are shaped so as to cast integrally with the front wall 23 and at the front thereof, two horizontally spaced bosses 101 and 102 (Figures 1 and 2) which are internally hollow by way of recesses 103 and 104 respectively that open into the rear face of thickened portions of the front wall 23, being formed by corresponding parallel-sided projections of the back mold part, the opposed parallel sides being also parallel to the direction of separating movement between the two mold parts so that upon separation the projections, which can also be slightly tapered for this purpose, will readily withdraw. The front ends of these mold projecting parts are half-cylindrical, as indicated at 105 in Figure 2 for the boss 101 and at 106 in Figure 9$^a$ for the boss 102.

As shown in Figures 4 and 10, the recess 103 that extends into boss 101 from the rear of front wall 23 intersects the right hand wall of boss 101 (Figures 1 and 4), thus leaving an opening in that side of boss 101 for the entry into it of one end of glass rod 97, but since the width of recess 103 is less than the width of boss 101, the left side (Figures 1 and 4) of boss 101 remains closed off by a web or wall 107 integral with boss 101. The recess 104 that extends from the rear into the right-hand boss 102 (Figures 1 and 4), however, is of the same width as boss 102 and accordingly the latter is open at both of its sides that project forwardly of the front wall 23, as is better shown in Figures 1, 4, 9$^a$, and 10. Bosses 101 and 102 are spaced to either side of the front wall aperture 40 (Figures 1 and 4), thus leaving intervening front wall portions 23$^x$ and 23$^y$ (Figures 4 and 10) the front faces of which are spaced from the bottom of recesses 103 and 104 in the two bosses 101 and 102 respectively by a distance somewhat in excess of the thickness or diameter of the glass rod 97 (see also Figure 2).

Accordingly, the lever 43 in home position, glass rod 97 can be entered into its transversely spaced supports (Figures 1 and 4) only by sliding it end-first in leftward direction and threading its left-hand end through open-ended boss 102, past the wall portion 23$^y$, crosswise of the lower edge portion of lever 43 and underneath the breaker lug 98, past the wall portion 23$^x$, and into the right-hand open end of boss 102 and into abutting relation against the closing wall or web 107 of the latter, thus bringing the right-hand end of rod 97 well inside of boss 102 and spaced leftwardly from the right-hand end thereof which end may now be closed off by a control member 109 in the form of a closure slide constructed to be easily stamped and formed out of sheet metal, having a conformation as is better shown in perspective in Figure 12 and constructed to be assembled and controlled only from the inside of the front cover 22.

For this purpose the back mold part that forms the recess 104 from the rear side of front wall 23 (see Figures 9, 9$^a$, and 10) is constructed to form two parallel slots 110 and 111 in the side walls of recess 104 but which (Figures 9$^a$ and 10) do not extend to the same depth as does the recess 104. These parts, namely, the recess 104 and opposed slots 110, 111, are at least partially formed also out of metal, shaped by the back mold part that forms a rearwardly directed boss 112 of substantial size (Figures 9 and 10) in the back face of which the slots 110, 111 open and in which is also molded from the rear a round hole 113 (Figures 10 and 9) which is threaded to receive a screw 114 (Figure 3) by which to secure in place flatwise against the rear face of boss 112, a small square assembly plate 115 (Figure 3), which is shown in a larger scale in Figure 11 alongside of Figure 12 in which the locking slide 109 is shown in perspective. Locking slide 109 has a vertical shank 116 rounded off as at 117 to conform to the rounded bottom 106 in boss 102 of recess 104 (Figure 9$^a$), the vertical shank 116 (Figure 12) being of slightly greater length than the depth of recess 104 as seen in Figures 9$^a$ and 10, being bent over at right angles to form a handle 118. The vertical shank 116 of locking slide 109 (Figure 12) has an intermediate portion of greater width forming parallel guide wings 121 and 122 for entry into the respective slots 110 and 111 (Figure 9), but they are of lesser vertical dimension than the length of the slots. The assembly plate 115 (Figure 11) has a hole 123 for screw 114 and spaced from which is a slot 124 dimensioned to receive therethrough the upper part of vertical shank 117 (Figure 12) of the locking slide, these two parts being first assembled by snaking the handle part 118 through slot 114 and then bringing the plate 115 through a right-angled turn and onto the upper part of vertical shank 117. So assembled the two parts are placed in position by entering the vertical shank 117 and its guide wings 121, 122 into recess 104 and the opposed slots 110, 111, bringing the assembly plate 115 flatwise against the flat end face of boss 112, whence screw 114 is threaded into hole 113 to anchor the plate 115 to the boss and to serve as a limiting stop to withdrawing movement of the locking slide 109. The assembled parts appear in plan as shown in Figure 3 and as indicated in broken lines in Figure 10.

As indicated in broken lines in Figure 10, the rounded part 117 of vertical shank 116 bottoms in the recess 104 in boss 102 (see also Figure 1), thus closing off the right-hand side of boss 102 and preventing removal of the glass rod 97. When in that position handle part 118 (see Figure 10) falls in the same plane with the rear edges of the side walls 24, 26, 25, and 27 of the front casing part 22 which when peripherally interengaging with the mounting plate 28 and so held by the latch mechanism 32 (Figure 2), positions the handle part 118 flatwise against a flat portion of the mounting plate 28 which thus acts to block movement of the locking slide 109 and accordingly, though the portion 116 of the slide 109 (see Figure 1) is exposed or accessible at the side of boss 102 on the front of the casing, it is thus impossible to manipulate the slide 109 through the opening in boss 102 as by a pin, screwdriver, nail, or the like, and thus the assemblage of glass rod 97 is tamper-proof.

When in such closing position, guide wings 121, 122 bottom in the slots 110, 111 respectively but, being shorter than these slots, the upper edges of the guide wings are spaced downwardly from the assembly plate 115 by a distance at least equal to the thickness of the frangible rod 97. Handle member 118 overlies a part of the assembly plate 115 and projects beyond (to the right in Figures 10 and 3) the right-hand end of the internal boss 112 so that when the front casing part 22 is swung about its hinged connection 30 and access to the interior is thus gained, the overhanging handle part 118 may be grasped by the fingers and pulled or lifted upwardly, being thus slidably guided by the guide wings and slots, until stopped by the assembly plate 115, thus moving the closing portion 117 of the vertical shank 116 out of closing position so that a rod can be entered into the supporting bosses 101, 102 from the front as above described to replace a broken one. The handle part 118 can bear a legend such as the word "Lift" (see Figure 3) which becomes legible when the front cover 22 is swung in opening direction.

Upon replacement of the glass rod the slide lock 109 should of course be pushed back (downwardly in Figure 10) into holding and blocking position, but if that is not done prior to swinging the front part 22 into closing position, as the front part swings closed and the latch mechanism 32 (Figures 2 and 14) snaps into latching position, handle part 118 engages the carrier plate 28 and by the final closing movement is thereby pushed home into locking and blocked position and there held against tampering, as above described.

With alarm lever 43 in home position (Figures 1 and 2) and glass rod 97 mounted and locked in position, break-glass lug 98 just overlies the rod 97 and thus, coacting with other features later described, can take part in holding the lever 43 in home position. With this relation of the parts the frangible member is broken in immediate response to initial movement of the alarm lever 43 out of home position, and in some installations it is desirable to initiate or activate a signal, usually a local signal, in response to a movement of alarm lever 43 out of home position in an amount that may or may not be sufficient to actuate the main signalling switch 55, as might happen as a result of malicious tampering with the station or as a result of inadvertence, when operating the station to send in an alarm, in not sufficiently swinging the alarm lever itself, and for this and other purposes it is preferred to provide an auxiliary signalling switch that is actuated in response to breakage of the glass rod 97. Such a switch may comprise the above mentioned switch unit 96 (Figures 2 and 13), which may be of the so-called micro-switch type, having an operating plunger 127 projecting from one end thereof which is normally biased by an internal spring or projected outwardly of the switch structure and which by known means and mechanisms internally actuates switch contacts for the making and breaking of one or more circuits. As a switch unit it is provided with two diagonally opposed holes for the reception of screws 128 for securing it in position, and on the inside face of front wall 23, spaced somewhat downwardly from the edge 40ᵃ of aperture 40 (Figure 4), I provide, by casting, a thickened part in the front wall that provides a flat vertical face 130 of small rectangular area and provided with two appropriately located threaded holes so that the switch unit 96 may be positioned and secured by the screws 128, 128, with a sheet metal frame plate 131 interposed between the switch unit 96 and the mounting face 130 (Figure 13), being clamped in position between the two. Plate 131 extends upwardly and has two spaced ears 132, 132 cut and struck up therefrom between which is a bell-crank lever 133 pivotally carried by a pivot pin 134 that extends through it and the ears 132. One arm of lever 133 (Figure 13) abuts against the end of switch plunger 127 and another arm extends through a slot 135 in the lower edge of alarm lever 43, the slot being formed by breaking out a correspondingly shaped portion 136 (Figure 5) of the plate lever 43, portion 136 being cast in the form of a thin web flush with the front face of the lever 43 and because of its thinness it is easily broken out in such case where the signalling apparatus is to include a switch unit 96 and actuating lever 133, as in Figures 3 and 13. As shown in Figure 13, this slot 135 is just in back of the glass rod 97 with which the lever 133 engages and by which it is held in normal unactuated condition against the bias of the spring that urges plunger 127 upwardly out of the switch unit 96. Accordingly, if glass rod 97 is broken, whether or not in response to actuation of the alarm lever 43, its fragmentation removes it as a stop for lever 133 (Figure 13) and accordingly switch plunger 127 is freed and moves upwardly, resulting in actuation of its internal switch contacts.

The flexible conductors 95 leading from break-glass responsive switch 96 (Figure 3) are looped downwardly (Figures 2 and 3) into close proximity to the axis of the hinge pins 30, 30 whence they are passed through an insulating cushioning bushing 137 (Figure 6) carried in a hole 138 positioned closely adjacent the bottom edge of plate 28 and to the rear of the latter the conductors are led and secured to tabs T of connector plates of the insulating connector terminal block 60, in this case to tabs T of plates like plates 87, 87 in Figure 15. The cable conductors that enter the box 20 extend the circuit of switch 96 to a local building signal, usually an identifying annunciator, through the corresponding binding screws 80, 80.

Upon inserting a new glass rod 97 in the manner above described, the switch lever 133 (Figure 13) is restored to its normal position and switch plunger 127 thereby restored and held in unactuated position.

In course of completion of assembly the various switches carried by the two-part hinged-together unit 22—28 are appropriately connected through their above-mentioned flexible conductors to the tabs T of appropriate connector plates of the terminal block 60 of which, as clearly appears from Figures 2 and 8, the binding screws 80, paired off and separated by the barrier flanges 78, face rearwardly (to the right in Figure 2), the terminal block 60 occupying a relatively small part (see Figure 8) of the cross-sectional area of the conduit box 20, thus when installing the signal station unit leaving plenty of room for accommodating the spare lengths of the color-coded cable conductors which need only to be appropriately connected to their proper coded binding screws 80, 80; thereupon the latch mechanism 32—35 is released and the front part 22 hinged downwardly away from the carrier plate 28 and the latter is brought into covering position over the front of the box 20, thus entering certain of the switch mechanism and also the frame-carried terminal block 60. As shown in Figures 2 and 8, the conduit box has opposed securing flanges or lugs 140, 140 provided with threaded holes, and carrier plate 28 is provided with correspondingly spaced slots 141, 141 (Figure 6) through which screws 142, 142 are passed (Figure 2) to secure the parts together as well as permitting leeway of adjustment so that the front part 22 may be mounted plumb even though the box 20 is out of plumb. The carrier frame 28 is peripherally of greater expanse than the recessed box 30 so that it can rest flush against the face of wall W even if the front edges of box 20 are not aligned with that front face.

As shown in Figures 2 and 3, a spring 144 coacts with the inwardly projecting lug 48 of alarm lever 43 and these parts are preferably interrelated so as to be double-acting. Conveniently spring 144 is bent up out of suitable flat sheet metal spring stock, being generally U-shaped and having a flat securing portion that rests flatwise against the end face of a heavy boss 145 that is cast integrally with the front wall 23 and the walls 42 of hand hole 41, the spring being secured thereto by a screw 146. The free or movable end of spring 144 is given a nose-like cam or convex operating part relative to which the top, side, and bottom faces of lug 48 as seen in Figure 2 ride as lever 43 is swung through about 90 degrees out of its home position and in effect the spring coacts during such a swing of lever 43 to perform several successive functions.

In home position of lever 43 (Figure 2) spring 144 presses downwardly at the inner end of long lug 48, thus exerting substantial force to the right of the vertical plane through the lever pivoting shaft 51 and the spring thus acts to releasably hold lever 43 in home position. Accordingly, in installations in which it is not desired or needed to employ a frangible member arranged, as in the above described embodiment, also to hold the lever 43 in home position, spring 144 holds the lever home, and does so with considerable force which has to be overcome when lever 43 is pulled.

As lever 54 is swung out of home position against the initial holding action of spring 144, lever lug 53 (Figure 2) starts swinging the switch toggle lever 54 clockwise about its axis 57 and disengages therefrom and by passes it at a point sufficiently beyond the dead-center or horizontal position to insure that its internal spring mechanism will snap it the rest of the way (to the broken line position in Figure 2), thus actuating the switch elements of switch unit 55, and during the first part of the movement of lever 43 glass rod 97 is broken and lever lug 48 swings to carry its inner end upwardly and outwardly, moving outwardly of wall slot 45 (Figure 4); thereby lug 48 moves itself out of the path of the snap-acting switch toggle lever 54. In so doing it may also bring its end face into coaction with the nose of the now substantially strained spring 144 which, in releasing its energy, can exert a counter-clockwise turning moment upon lever 43, tending to kick or snap lever 43 to insure completion of its range of movement, limited by engagement of lever lug 53 against the inside face of wall 44 to either side of slot 45 (Figure 4). Break-glass lug 98, having broken the glass rod 97 and its fragments having dropped out of the holders, can enter a slot 148 (Figure 3) in the front wall edge $40^a$ (Figure 4), slot 148 being formed by breaking out a corresponding shaped thin web 150 (Figure 4) the front face of which is flush with the front face of wall 23, being formed during the casting operation by appropriately recessing or thinning that wall from the rear side thereof.

When alarm lever 43 reaches the limit of its counter-clockwise swing in Figure 2, assuming a position about horizontal or somewhat tilted downwardly from horizontal, its inside face becomes exposed to reveal and make legible the legend of instruction, such as that shown in Figure 5, reading "Open Station to Reset," which is hidden and upside-down when lever 43 is in home position. Lever 43 is blocked against return movement to home position because in its upper or actuated position switch toggle lever 54 stands in the path of inward swing of lever lug 48 and accordingly main signalling switch 52 remains in actuated or signalling condition and cannot be restored by reverse actuation of the alarm lever 43 because of the blocking or interlocking action of its toggle lever in relation to the reverse path of movement of lever lug 48.

In Figures 20–23 are diagrammatically shown illustrative contact arrangements of the main signalling switch unit 55 and of the non-interfering switch unit 62, as well as illustrative electrical relationships between the two switches, the mechanical interlocking or interdependence of the two being indicated diagrammatically. In each of these diagrammatic representations main signalling switch 55 may be double-acting, that is, it may comprise two sets of contacts or two sets of switch elements, indicated at A and B, being conjointly actuated as is indicated diagrammatically by the insulating mechanical link 151. Switch contacts A connected by conductors 58 to the terminal block as above described are through the latter connected in circuit with other local alarm stations and as these four figures show, they may be so connected in various ways according to the type of system or circuit arrangement employed such as, for example, a normally closed series system (Figures 21 and 23) or a parallel system (Figures 20 and 22). Switch contacts B of main signalling switch 55 may be connected by conductors 58 through the terminal block 60 to the city alarm system as, for example, to a nearby city alarm box, and these contacts may be normally closed as in Figures 20 and 21 or normally open as in Figures 22 and 23, according to the requirements of the system. Switch unit 62 (Figures 2, 6, and 7) has its switch contacts C connected as by the conductors 72 in parallel with the contacts B of switch 55, and during assembly this wiring may be effected by directly interconnecting the two sets of switch contacts B and C of the two switches or such interconnection may be effected at the terminal connector block 60. Where switch contacts B of switch 55 are normally closed as in Figures 20 and 21, the coacting actuating elements 68 and 66 of switch unit 62 (Figures 2, 6, and 7) normally hold contacts C of the latter open, the reverse being the case in the arrangements of Figures 22 and 23 where the normal or unactuated position of switch contacts B is open. Switch unit 62 is held in normal condition by latch 35—32 for when the latter is released, front part 22 at once swings open under the influence of its weight which is to the left of the pin axis 30 (Figure 2).

Accordingly, when the alarm lever 43 is actuated as above described, contacts A and B of switch 55 are conjointly actuated to initiate signals as above described; contacts C of switch 62 remain in normal or unactuated condition since switch stem 66 carried on the inside of the hinged front cover 22 (Figure 2) is held against movement by latch 35—32. Switch toggle lever 54 (Figure 2) remains in uppermost position and blocks alarm lever 53 against return to home position, and the apparatus has to remain in that condition, with the signalling circuits controlled by contacts A and B (Figures 20–23) of main switch 55 likewise remaining activated. When someone in authority thereupon actuates the latch mechanism, front part 22 swings open to withdraw switch stem 66 from switch plunger 68 of switch unit 62 (Figure 7), the initial withdrawing movement thus immediately actuating contacts C of switch 62 to closed position in Figures 20 and 21 and to open position in Figures 22 and 23; the reverse takes place as stem 66 restores the plunger 68 when front part 22 is latched in closing position. Having opened the station, the first thing to do is to restore toggle switch lever 53 to its normal full-line position shown in Figure 2, aided by an appropriate legend on the front face of plate 28 as shown in Figure 6. Having restored toggle switch lever 54 to normal full-line position (Figure 2), the station cannot be closed nor the front part 22 locked or latched unless signal lever 43 is first returned to home position for otherwise lever lug 53 (Figure 2) stands in a position where upon closing movement of the front part 22 it collided with the projecting end of switch lever 54, precluding complete closure. Accordingly all parts must first be returned to normal before the station can again be closed, closure effecting restoration of contacts C of switch 62 as above noted.

Where the station is equipped with a frangible member such as the glass rod 97, the rod is broken upon initial movement of signal lever 43 out of home position and has to be replaced, and according to features of my invention the insertion of a new or unbroken glass rod is made advantageously to take part in the above described actions. After resetting the switch lever 54 to normal, a new glass rod 97 is put in place, and it will be noted that in order that it can be entered into its supports, signal lever 43 must first be returned fully to normal for otherwise the path of inserting movement of the rod 97, from right to left in Figure 1, is blocked off by the lever 43 itself which is in downward position and is also blocked off by the break-glass lug 48 which does not move out of the way (see Figure 2) unless and until the signal lever 43 is completely returned home. If the apparatus also includes a break-glass responsive switch 96 (Figures 2 and 13), that switch remains actuated for so long as a glass rod is absent and is restored to unactuated or normal condition, as above described, by the insertion of a new glass rod 97, thus conditioning that switch for closing and latching of the station. Moreover, as above described, by the coaction between the handle 118 and the locking slide 109 (Figures 3, 12, and 10) with the carrier plate 28, closing and latching of the station make certain that the part 116 of the lock slide 109 (Figure 1) moves to position to close off the socket opening in the rod support 102. If glass rod 97 is not fully inserted into position (substantially as in Figure 1), its right-hand end blocks closing movement of the lock slide 109 and hence would also block completion of closing and latching movement of the front cover 22, so that there is assurance also that the new glass rod is properly and completely inserted in position.

If it is attempted to close the station by restoring alarm lever 43 to normal without having restored toggle switch lever 54 to normal, the latter stands in the path of inward movement of lever lug 48 and blocks completion of closing and latching movement. A simple legend of instruction on the front of mounting plate 28, as indicated in Figure 6, can serve as a guide but even without the legend the mutually interfering positions taken by the parts, excepting when they are each restored to normal, makes certain that proper restoration is effected before the station can be latched closed.

These features also make for simplicity and foolproofness of conducting a test of any particular installed station as, for example, when it is desired to sound simply a local alarm for test or drill purposes. The station is opened up by operating the latch mechanism 32—35 whereupon the main switch signal lever 54 may be manually actuated by swinging it from its normal downward position to its upward or test position (Figures 2 and 6), aided by legends of instruction (Figure 6), such actuation of the main signalling switch shifting the contacts A and B of switch 55 (Figures 20–23), but only the circuits at contacts A are activated because the actuation of latch 35—32 and immediate opening movement of the front part 22 of the station immediately actuate non-interfering switch unit 62 in that stem 66 (Figure 2) is withdrawn from switch plunger 68 (Figures 7 and 6) and switch 62 is immediately actuated, being closed in the circuit arrangement of Figures 20 and 21 and opened in the arrangement of Figures 22 and 23, thus to maintain the circuit leading to the city alarm or city boxes and thus nullifying or negativing the effect of contacts B of main signalling switch 55 when the latter is thereafter manually actuated to test position. The switch operator 54 may thus be manually freely manipulated for local alarm or drill purposes without risk of activating the circuit or circuits to the city alarm or city boxes.

Upon completion of the test or drill operation the station is to be closed, and here again it cannot be closed and latched unless the switch lever 54 is first restored to normal, as will now be clear, thus insuring the restoration of contacts B of switch 55 (Figures 20–23) to normal before switch 62 is actuated, at the very completion of closing and latching movement, to restore contacts C to normal and thus leave the main alarm or city box circuit under the control of contacts B of the main signalling switch 55.

The practice of my invention and the achievement of its many advantages will be clear from the above. The mechanical features may be embodied in other forms, particularly where it is desired to achieve different or other advantages; for example, it might be desired to embody a switch unit 55 in which the operator thereof instead of being in the form of a pivoted toggle lever 54 as above described (Figure 2), is in the form of a reversibly slidable handle or knob 155 (Figures 24 and 25) projecting through a guide slot in a face of the switch unit 55 which is constructed in any suitable or known manner, internally, to reversibly guide the operator 155 along a straight-line path and to shift circuit-making and breaking contacts such as contacts A and B above described (Figures 20–23), usually with a snap action, according to the position assumed by the operator 155 at the ends of its reversible strokes of movement, an action which may be aided by any suitable internal means such as that diagrammatically shown in Figure 25 wherein a suitably mounted flat spring 156, provided with a V-bend at its free end as indicated, coacts with two spaced notches, as shown, in an internal slide member 157 to releasably hold the switch mechanism and operator 155 in either of its end positions and by appropriate camming action between the V-bend and the notches coact in insuring that the guided slide 157 and operator 155 complete their stroke of movement in either direction.

With such a switch unit 55 having a slidable operator 155 it is possible to simplify assembly and mounting of certain of the parts. For example, the base part $61^a$ of U-frame 61 that carries the terminal connector block 60 is provided with a slot $61^k$ through which the operator 155 projects when switch unit 55 is fitted against the base plate $61^a$ and between the side plates $61^b$ and $61^c$, being secured or held in place by screws 158 that bridge across the parallel side plates to clamp the switch unit 55 between the latter. The resultant sub-assembly, including switch unit 62 secured externally to one of the side plates of U-frame 61, is secured at the back of carrier plate 28 with base plate $61^a$ resting flatwise thereagainst, carrier plate 28 having a slot 160 that overlies slot $61^k$ so that slidable switch operator 155 projects to the front of plate 28 and its reversible movement is not impeded. U-frame 61 may conveniently be secured to carrier plate 28, as for example, by ears $61^p$ cut and stamped out of the base plate $61^a$ and passed through suitable holes in plate 28 and then bent over into clamping position.

The slidable switch operator 155 is thus presented for coaction with the spaced lugs 53 and 48 of the alarm lever 43. When lever 43 is actuated as above described, lever lug 53 engaging at the underside of the slidable switch knob 155 (Figure 25), slides the latter upwardly out of its normal position and into signalling position, aided by the coaction between the spring 156 and the notched slide 157. By the time that shift of switch operator 155 is completed, the continued swing of lever lug 53 by-passes the switch operator and the several parts thereof coact to mutually block each other or interfere so that subsequent restoration of the station to normal, including replacement of a broken glass rod, cannot be effected unless all of the parts are restored to normal before the station is closed and latched. For example, the upper or actuated position of knob 155 (Figure 25)

locates it in the path of return swinging movement of lever lug 48 should the attempt be made to restore alarm lever 43 after it has been actuated in signalling direction. Upon opening the station, resetting of the parts proceeds in a foolproof manner; closure of the front part 22 is blocked by lever lug 53 that collides with switch operator 155 in home position if signal lever 43 is out of home position, and closing movement is blocked by lever lug 48 colliding with switch operator 155 if alarm lever 43 has been returned to home position and switch operator 155 has been left in actuated position. When the station is open for test or drill purposes, bringing into coaction also switch 62 as above described, switch operator 155 has to be shifted to its normal or home position before the station can be closed for otherwise it stands in the path of inward movement of lever lug 48 when it is attempted to close and latch the front casing part 22.

For further illustration and not by way of limitation, certain features may be embodied in the form illustrated in Figures 26 and 27 wherein the switch unit 55, secured to the U-frame 61 shown in Figure 25 and with the U-frame secured to the carrier plate 28 as shown in Figures 24 and 25, may be of the type in which the operator is a reciprocable plunger 162 as shown in Figure 27, being spring-biased (to the left in Figure 27) and reciprocable in reversible strokes for shifting circuit-makers and breakers such as contacts A and B of Figures 20–23 according as the plunger is held depressed or is released for outward projection through registering round holes 61$^{a}$ and 163, the former in the base plate 61$^{a}$ of U-frame 61 and the latter in the carrier plate 28. In Figure 27 plunger 162 is shown in retracted position, the internal switch contacts being in normal or unactuated condition.

Overlying carrier plate 28 and plunger 162 is a movable plunger control or latch plate 164 and illustratively it may be mounted for reversible strokes of movement as, for example, by two spaced headed studs 165, 165 secured in the carrier plate 28 and passing through slots 166, 166 in the control plate 164 so that the latter might partake of limited sliding movement along the face of plate 28 and relative to the switch actuator plunger 162. In Figure 26 part 164 is shown in one extreme position of its possible movement as determined by the studs and slots 165—166, being at the extreme of its possible leftward movement and in that position a middle portion of slide plate 164 overlies switch plunger 162 and holds it retracted or depressed. To the left of that middle portion of plate 164, slide plate 164 has a hole 167 of slightly larger diameter than that of switch plunger 162 and so positioned that when slide plate 164 is moved to the right and just before that movement is halted by the studs and slots 165—166, hole 167 is brought over switch plunger 162 and the latter is freed to be projected outwardly (to the left in Figure 27) under its internal biasing spring, thus shifting or actuating the internal switch contacts such as contacts A and B above mentioned. At the same time switch plunger 162 in entering the latch plate hole 167 locks and holds plate 164 against shift, and plate 164 cannot be released for shifting unless and until switch plunger 162 is first depressed.

The front part 22 (Figures 26 and 27) may be constructed as above described except that the front wall thereof shown at 23$^{a}$ in Figures 26 and 27 movably carries a signal actuator generally indicated by the reference character 168 that is pivoted to swing about an axis at right angles to the plane of the front wall 23$^{a}$ which is provided with an aperture 170 at which the external actuator 168 is mounted by means of a shaft 171 the bearing surface for which is the internally cylindrical face of the aperture 170 which, like the rest of the front cover 22, may be formed therein by casting, including the casting of the annular internal boss 172 by which the bearing for shaft 171 may be given greater axial length. Stud shaft 171 which may be formed integrally with the actuator 168 thus provides with the aperture 170 a pivotal support for the actuator 168 which may be provided with one or more, preferably two, lever arms 168$^{a}$ and 168$^{b}$ (Figure 26) by which the actuator 168 may be turned about the pivoting axis. The latter is located above and preferably centrally of the spaced glass-supporting bosses 101 and 102 in which the glass rod 97 is supported as above described and with which glass rod 97 the break-glass responsive switch unit 96 may coact as above described by way of lever 133 which engages with the glass rod 97 through a hole 173 in front wall 23$^{a}$, that hole being cast with a thin front closing web which may be easily broken out just as was described above in connection with breaking out the thin web 136 in Figure 5 to provide the slot 135 through which the lever 133 in Figure 13 projects to abut against glass rod 97.

The inner end of lever shaft 171 has an arm or lug 175 non-rotatably secured thereto which can also serve to hold the actuator 168 assembled to the front part 22; thus the inner end of shaft 171 may have a square end 171$^{a}$ that takes into a square hole in the end of arm 175 and that is then headed over as shown in Figure 27. The outer end of arm 175 enters between two forwardly projecting lugs 176 and 177 on slide plate 164 and they may be integrally formed therewith by stamping or bending parts of the heavy sheet metal of which plate 164 is made.

In the illustrative embodiment, with switch plunger 162 in normal or depressed position and slide plate 164 also in its normal or leftmost position, spaced lugs 176 and 177 are equally spaced from the vertical center line through the axis of actuator shaft 171 and arm 175 assumes a vertical position as shown in Figure 26, externally accessible actuator 168 correspondingly assuming its home position which where it comprises two handle-like lever arms 168$^{a}$ and 168$^{b}$, is a position in which these arms are horizontal as shown in Figure 26. Overlying front wall 23$^{a}$ and desirably formed integrally with the parts 168$^{a}$ and 168$^{b}$ and shaft 171 is a hub-like disc 178 that is relatively thick (Figure 27) and of a radius such that its front face (Figure 26) can partially overlie the glass rod 97 with the thus overlapped portion of glass rod 97 accommodated in a recess 180 which is formed in the disc 178 to the rear of its front face and along a chord of the circle of the disc as indicated in the broken lines in Figure 26, that chord being substantially coincident with the upper edge of glass rod 97 as Figures 26 and 27 show.

Accordingly, in inserting the glass rod 97 first through the right-hand open-ended boss 102 and then into the left-hand boss 101 (Figure 26), the externally accessible actuator 168 must be given its normal or home position in order to bring the chord-like back recess 180 in the hub disc 178 parallel to the line of the sockets in bosses 101 and 102 for in any other position of the actuator 168 and disc hub 178 the periphery of the latter prevents the left-hand end of glass rod 97 that is being slid to the left through right-hand boss 102 from becoming aligned with left-hand boss 101 for entry into the latter. However, once the glass rod 97 is entered in position and locked by the slide lock 109, with the actuator 168 in home position, the coaction between the chord-like recess walls 180 and frangible member 97 holds the actuator 168 in home position and also holds the arm 175 internally in normal or home position, and front part 22 cannot be swung into completely closed and latched position unless switch plunger 162 is first manually depressed to disengage it from the walls of hole 167 in slide plate 164 and the latter also slid manually to its leftmost or normal position, as shown in Figure 26. To aid in these actions the walls of hole 167 may be internally tapered as indicated by the broken line in Figure 26 and carrier plate 28 can bear appropriate legends of instruction as indicated in Figure 26.

The front face of disc hub 178 may also bear appropriate legends such as "Turn in Case of Fire" (see Figure 26). Such actuation of the external actuator 168 proceeds in a simple and foolproof manner. In the illustrative modification it cannot be turned counter-clockwise since slide latch plate 168 is in its leftmost position stopped by the guide studs 165, 165 and accordingly lug 176 blocks counter-clockwise movement of arm 175. Accordingly confusion in actuation does not arise and the layman thus turns the handle 168 in the only direction in which it yields, namely, clockwise in Figure 26, thus tilting the wall of chord-like groove 180 relative to the glass rod 97 and substantially at the center of the latter applying multiplying and powerful downward wedging forces to break and fragment the glass rod 97 to which the switch unit 96 responds through lever 133 (Figure 27), and while this is happening arm 175 moves to the right to also move the latch slide plate 164 to the right, through its engagement with the lug 177. The range of rotary movement of actuator 168 need not be great and with the initial and somewhat momentary resistance caused by having to break the glass rod 97, the completion of the clockwise swing of actuator 168 and internal arm 175 can take place with a sort of snap action which is halted the moment that slide plate hole 167 comes over the spring-biased plunger 162 which is thereupon projected into it, thus actuating the switch unit 55 and its contacts A and B of Figures 20–23 and thus also locking the slide plate 164 against movement in either direction. Thereby internal arm 175 and the external actuator 168 are both locked in out-of-home position, actuator 168 thus giving an external visual indication that the station has been operated. The front wall 23ᵃ in that horizontal portion of it that underlies the glass rod 97 can bear a legend, which may be cast into it, reading "Open Station to Reset," the legend becoming clearing legible upon the glass rod 97 being broken and its fragments falling out of the holders 101 and 102.

Upon opening the station internal arm 175 becomes disengaged from spaced lugs 176, 177, thus freeing the manual actuator 168 so that it can be positioned as above described for the reception of a new glass rod 97 in the supports 101, 102, whereupon actuator 168 and internal arm 175 become set in normal or home position. The front part 22 cannot be swung closed and latched because lug 176 stands in the path of internal arm 175 and accordingly switch plunger 162 must first be depressed to release slide plate 164 and the latter moved to its normal leftmost position as shown in Figure 26, thus also holding the switch plunger operator 162 in its restored position. The front part 22 can now be closed and locked.

Desirably suitable means may be provided to confine the range of pivoting movement of the actuator 168 to one that is slightly in excess of the operative range of movement of the arm 175 in coaction with the slide plate 164 and as shown in Figures 26 and 27, such means may comprise an arcuate groove 182 cast or formed in the rear face of the disc hub 178 into which a pin or projection extends provided in the recessed or set-back portion of the front wall of the front part 22, an arrangement which also insures proper assembly of the several parts; for example, the legend-bearing actuator 168 cannot be assembled to the front wall in upside-down relation from that shown in Figure 26 nor can it be so assembled that the glass-breaking ledge or wall 180 is in other than lowermost position as shown. Moreover, the parts 182—183 can also be so proportioned that their limiting actions prevent overstressing of the actuated parts; also they facilitate replacement of a broken glass rod 97 in that the actuator 168, when manually held by the parts 182—183 at the limit of its clockwise swing in Figure 6, causes the recess wall 180 to be aligned and positioned horizontally for the passage of the glass rod 97 into its supports 101, 102.

For test or drill purposes the station is simply opened up, non-interfering switch unit 62 being actuated at the initiation of such opening movement by the disengagement of stem 66 from plunger operator 68 (Figures 2 and 3), thus shifting contacts C (Figures 20–23) before it is possible to actuate switch unit 55; having opened the station, switch unit 55 may now be freely actuated without sounding the city alarm at contacts B. Such manual actuation of switch unit 55 in Figures 26 and 27 is accomplished by simply manually shifting slide plate 164 to the right, thereby releasing switch plunger 162 and also locking the slide plate 164. Here again closure of the station cannot be effected, as is now clear, unless switch unit 55 is first restored to normal by depressing plunger 162 and shifting slide latch plate 164 back to its leftmost position, whence arm 175 can enter between lugs 176, 177 and closure and latching of the front casing part cannot be blocked.

In Figures 28–31 a modification is illustrated by which certain other advantages may be achieved. For example, the switch unit 55 may be of the type in which the switch operator is rotary about an axis at right angles to the carrier plate 28 and may comprise a handle or knob-like member 185, which may be knurled for ease of manual actuation, secured at the front of the carrier plate 28 on a rotational shaft 186, as by a set-screw 187, the switch shaft 186 extending from the interior of the switch unit 55 through registering holes in the frame part 61ᵃ and in the frame plate 28. The switch knob or operator 185 has a radial arm 188 extending from it and integrally formed therewith, and the carrier plate 28 may be provided with pins or studs 191 and 192 (Figure 29) to serve as limiting stops between which the arm 188 may swing from a normal or non-signalling position to an actuated or signalling position, and vice versa, the corresponding rotational movements of the switch shaft 186, by any suitable or known internal mechanism, setting the internal switch contacts such as switch contacts A and B of Figures 20–23 according to the position given the operator 185 as determined by the stops 191, 192. The front face of plate 28 (Figure 29) may carry appropriate legends, such as "Normal" and "Test," adjacent the stops 191 and 192 to serve as guides for testing or drill purposes. In the modification shown the normal or non-signalling position of the switch mechanism corresponds to the full-line position of arm 188 adjacent the stop 191.

The just described rotary switch structure may be located so that its axis is coincident with the axis of the shaft 171 of the actuator 168 described above in connection with Figures 26 and 27 when the front part 22 is in closing position. The inner end of actuator shaft 171, instead of carrying the arm 175 as in Figures 26 and 27, has a sector-shaped arm 193 non-rotatably secured thereto that terminates in an arcuate flange 194 the center of which is coincident with the axis of actuator 168 and its shaft 171. The inner edge of arcuate flange 194 terminates in proximity to the front face of carrier plate 28 and substantially at its midpoint the flange is provided with a slot 195 of a width slightly greater than the thickness of the switch arm 188 so that the latter may be freely accommodated therein when the front part 22 is in closed position, the switch arm 188 being thus received between the two spaced parts 194ᵃ and 194ᵇ of flange 194.

With the actuator 168 in its normal position, the glass rod 97 in place, and the pin 183 and arcuate groove 182 in the hub 178 holding the parts against clockwise swing and with the switch operator 185 in normal position as shown in Figure 29, the arcuate extents of the flange parts 194ᵃ and 194ᵇ to the left and to the right of the slot 195 may be substantially as shown in Figure 29, the right-hand part 194ᵇ extending at least into the position which the arm 188 would occupy at the test position shown in broken lines and the left-hand part 194ᵃ being of an extent so its left-hand end would intersect the full-line or normal position of switch arm 188 if the arm 193 with its arcuate flange 194 were to be given its full range of clockwise rotary movement as limited by the coaction between the stop 183 and the arcuate groove 182 in the hub 178.

If actuator 168 is now turned to move arcuate flange 194 clockwise in Figure 29 to transmit the alarm signals, switch operator arm 188 is moved from its normal position to its actuated position adjacent stop 191, the initial rotary movement of actuator 168 breaking the glass rod 97 in the manner and with results earlier above described. Actuator 168 and coacting parts may be locked in the just described actuated positions, and this may be achieved by means of a spring-biased latching or locking member conveniently in the form of a short flat spring 198 which is secured flatwise against the carrier plate 28 as by rivets or screws 200 so positioned and located that a free end portion of the flat spring 198 extends into the path of movement of the arcuate flange 194, being of a thickness somewhat less than the spacing of the edge of flange 194 from the plate 28 when the front casing part 22 is locked in closed position, as shown in Figure 30. This free portion of flat spring 198 is normally biased upwardly as viewed in Figure 30, and when the actuator 168 and flange 194 are in normal or starting position, the edge of flange part 194ª overlies the flat spring latch 198 as shown in Figure 29 and holds it in ineffective position and against its spring bias. Accordingly, by the time the clockwise rotation of flange 194 and switch operator arm 188 (to the broken-line position in Figure 29) is completed, the edge of flange part 194ª rides off the flat spring 198, thus freeing it for upward movement into the position shown in Figure 31 and thus blocking the retrograde or counter-clockwise return movement of arcuate flange 194. The switch operator and switch unit 55 are thus held in actuated or signalling condition, and the external actuator 168 is also held in actuated position (tilted clockwise from the horizontal position shown in Figure 26) and thus gives an external visual indication that the station has been operated.

The breaking of the glass rod 97 reveals (see Figure 26) the instruction to open the station in order to reset its mechanism and upon opening the front part 22, non-interfering switch unit 62 and its contacts C are actuated, and arcuate flange 194 is swung away and disengaged from the switch operator 188, thus freeing the latter for resetting. It may be manually reset as will now be clear, but preferably switch unit 55 and its switch shaft 186 (Figure 28) are arranged in any suitable manner, as by a spring 201, to bias the shaft 186 and the switch operator 185 in counter-clockwise direction as viewed in Figure 28. Accordingly, the initial actuation of the switch arm 188 to signalling position further tensions the return spring 201 so that upon the subsequent opening of the station and the withdrawal by the front part 22 of the slotted arcuate flange 194 out of engagement with the switch arm 188, the latter and the switch operator 185 are freed so that the return spring 201 can at once reset the switch unit 55 to normal. By appropriately proportioning the several coacting parts, the movement of the arcuate flange 194 in response to opening movement of front casing part 22 can be made to effect a disengagement of flange 194 from the flat spring latch 198 before the part 194 is disengaged from the switch operator arm 188, in which case the return spring 201 not only returns the switch operator to normal but also returns the actuator 168 to normal.

In any case the station cannot be closed unless the switch operator 185—188 stands at normal position and the external actuator 168 is likewise in normal or home position. If switch arm 188 is in normal position and actuator 168 is not in home position, the slot 195 in arcuate flange 194 is not aligned with the switch arm 188 and the flange 194 and switch arm 188 collide on attempted closing movement of front part 22, and accordingly, with the switch operator arm 188 biased and held in its normal position by spring 201, external actuator 168 has to be set in its home position to effect closure of the station. Upon closing movement of front part 22, with actuator 168 in home position, arcuate flange part 194 is brought into a position overlying the free outwardly-biased part of flat spring 198 and the completion of closing movement flexes the flat spring 198 from the relation shown in Figure 31 to the relation shown in Figure 30, and it is in the latter relationship that the parts are held, in readiness for subsequent actuation of the station, by the latch construction 35—33 (Figures 2 and 14) that coacts between the front part 22 and the plate 28.

In the modification of Figures 28–31, for test or drill purposes the front part 22 is unlatched and swung open, first actuating the non-interfering switch unit 62 and its contacts C (Figures 20–23), thus maintaining the circuit of contacts B of the main signalling unit 55 inactive so that the later, with its operator 185—188 standing at normal in Figure 29, may now be actuated against the bias of the return spring 201 so as to effect signalling at contacts A. As before, and as above described, ensuing closure of the station is not effected unless and until the several coacting disengageable parts stand at normal.

From the foregoing description of several illustrative embodiments of my invention its principles and the practice thereof will now be clear, and it will also be seen that the invention is of a thoroughly practical character and that it makes possible the achievement of many advantages. It will also be seen that the various objects heretofore noted or indicated are successfully achieved.

As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. In signalling apparatus, in combination, a two-part mounting for signalling switch means and actuating and control means therefor comprising a part carrying signal switch means and a non-interfering switch and a companion part carrying a movable actuator having an externally accessible element for manually moving it out of and back into a home position, and a frangible member, said companion part having carrier means for said frangible member including a movable control means for holding the frangible member against removal from said carrier means and adapted, upon actuation, to permit replacement of a broken frangible member by an unbroken member, said actuator having a part engageable with said frangible member to break it upon movement of the actuator out of home position whereby said actuator has to be in home position for replacement of the frangible member, said two parts of said two-part mounting means having controllable means separably securing them together so that upon separating movement access may be gained to said signalling switch means, said companion part and said non-interfering switch having coacting means for activating said switch in response to separating movement and to inactivate it in response to bringing said companion parts together, said actuator and said signalling switch means having means forming a disconnectible one-way driving connection that is disconnectible in response to separating movement between said two companion parts whereby said signal switch means is activated in response to movement of said actuator out of home position and, upon separating movement between said two companion parts, said signal switch may be manually actuated to non-signalling condition, said driving connection comprising coacting elements that are operatively interconnectible upon restoration of said two separable parts only when said actuator is restored to home position and said signal switch means is set to non-signalling condition, said movable control means associated with said frangible member carrier means and said first-mentioned of said companion parts having coacting elements that block bringing said companion parts together unless said movable control means is in holding position relative to said frangible member and said carrier means and that are responsive to separating movement between said two companion parts for releasing said movable control means for actuation in a direction to permit assembly of a frangible member to said carrier means.

2. In signalling apparatus, in combination, a two-part mounting for signalling switch means and actuating and control means therefor comprising a mounting plate having a U-shaped frame at the rear thereof carrying a terminal connector block and, between the arms thereof, signalling switch means having a movable operator exposed at the front of said mounting plate with a non-interfering switch carried by said U-frame and having an operating member exposed toward said mounting plate, said mounting plate having an aperture juxtaposed to said operating member, said signalling switch means and said non-interfering switch having wiring interconnecting them to terminals of said terminal block, a companion part carrying a movable actuator having an externally accessible element for manually moving it out of and back into a home position, with means hingedly connecting said companion part to said mounting plate for moving the former into and out of closing relation to the latter, said companion part having an internal actuator member movable into and out of said mounting plate aperture to control said non-interfering switch operator member accordingly as said companion part moves out of or into closing relation to said mounting plate, and one-way operating connections between said signalling switch means operator and said movable actuator for actuating said signalling switch means in response to movement of said actuator out of home position whereby said signalling switch means remains in actuated condition and said actuator remains out of home position, said operating connections comprising coacting parts that are disconnectible in response to swinging said companion part out of closing position and that are interengageable in response to closing movement of said companion part relative to said mounting plate only when said actuator is restored to home position and said signalling switch means is set to non-signalling condition.

3. In signalling apparatus, in combination, a two-part mounting for signalling switch means and actuating and control means therefor comprising a mounting plate having a U-shaped frame at the rear thereof carrying a terminal connector block and, between the arms thereof, signalling switch means having a movable operator exposed at the front of said mounting plate with a non-interfering switch carried by said U-frame and having an operating member exposed toward said mounting plate, said mounting plate having an aperture juxtaposed to said operating member, said signalling switch means and said non-interfering switch having wiring interconnecting them to terminals of said terminal block, a companion part carrying a movable actuator having an externally accessible element for manually moving it out of and back into a home position, with means hingedly connecting said companion part to said mounting plate for moving the former into and out of closing relation to the latter, said companion part having an internal actuator member movable into and out of said mounting plate aperture to control said non-interfering switch operator member accordingly as said companion part moves out of or into closing relation to said mounting plate, a frangible member replaceably carried by said companion part and exposed externally thereof, said movable actuator having a part engageable with said frangible member to break it upon movement of the actuator out of home position whereby said actuator has to be in home position for replacement of the frangible member, and switch means wired to terminals of said terminal block and having means responsive to breakage of said frangible member for actuating it whereby it remains in unactuated condition so long as said frangible member remains unbroken and said actuator remains in home position, said actuator having means forming a disconnectible one-way driving connection with said signalling switch means operator that is disconnectible in response to uncovering movement of said companion part relative to said mounting plate whereby said operator is moved to remain in signalling position in response to movement of said actuator out of home position, said operating connection comprising coacting elements that are operatively interconnectible upon movement of said companion part into covering relation to said mounting plate only when said actuator is restored to home position and said signalling switch means operator is in non-signalling position.

4. In signalling apparatus, in combination, a two-part mounting for signalling switch means and actuating and control means therefor comprising a mounting plate having a U-shaped frame at the rear thereof carrying a terminal connector block and, between the arms thereof, signalling switch means having a movable operator exposed at the front of said mounting plate with a non-interfering switch carried by said U-frame and having an operating member exposed toward said mounting plate, said mounting plate having an aperture juxtaposed to said operating member, said signalling switch means and said non-interfering switch having wiring interconnecting them to terminals of said terminal block, a companion part carrying a movable actuator having an externally accessible element for manually moving it out of and back into a home position, with means hingedly connecting said companion part to said mounting plate for moving the former into and out of closing relation to the latter, said companion part having an internal actuator member movable into and out of said mounting plate aperture to control said non-interfering switch operator member according as said companion part moves out of or into closing relation to said mounting plate, a frangible member replaceably carried by said companion part and exposed externally thereof, said movable actuator having a part engageable with said frangible member to break it upon movement of the actuator out of home position whereby said actuator has to be in home position for replacement of the frangible member, said companion part having a movable control means for holding the frangible member against removal and adapted, upon actuation, to permit replacement of a broken frangible member, said movable control means including a part exposed interiorly of said companion part and engageable with said mounting plate and thereby held against movement when said companion part is in covering relation to said mounting plate, and said actuator having means forming a disconnectible one-way driving connection with said signalling switch means operator that is disconnectible in response to uncovering movement of said companion part relative to said mounting plate whereby said operator is moved to remain in signalling position in response to movement of said actuator out of home position, said operating connection comprising coacting elements that are operatively interconnectible upon movement of said companion part into covering relation to said mounting plate only when said actuator is restored to home position and said signalling switch means operator is in non-signalling position.

5. In signalling apparatus, in combination, a mounting for signalling switch means and actuating and control means therefor comprising a part adapted to be secured to a support and a cover movably connected thereto for movement into and out of covering position, said part carrying signal switch means having an operator selectively movable into and out of signalling and non-signalling positions and said cover movably carrying an externally accessible manually-operable actuator that is movable out of and into a home position, said actuator and said operator having operating connections for actuating said operator to signalling position in response to movement of the actuator out of home position and for holding said actuator against movement to home position together with means operating in response to subsequent change of the position of said operator to non-signalling position for freeing said actuator for movement to home position.

6. In signalling apparatus, in combination, a back casing part having means for the entry thereinto of conductors and a wired-up signalling sub-assembly attachable thereto comprising a front casing part and a mounting plate attachable to said back casing part and having said front casing part hingedly connected thereto with a U-shaped frame at the back of said mounting plate and a terminal connector block secured by clamping ears on the ends of the arms of said U-shaped frame with signal switch means wired to said terminal block for connection to said conductors and positioned between the arms of said U-shaped frame whereby said frame and switch means and terminal block are entered into said back casing part upon securing said mounting plate to the latter, said signal switch means having an operator exposed forwardly of said mounting plate and selectively movable into and out of signalling and non-signalling positions, said front casing part movably carrying an externally accessible manual actuator that is movable out of and into a home position, said actuator and said operator having operating connections for actuating said operator to signalling position in response to movement of the actuator out of home position, and said operating connections comprising coacting parts that are disengageable in response to hinging movement of said front casing part in uncovering direction and that are re-engageable in response to reverse hinging movement of said front casing part only when said operator is in non-signalling position and said actuator is in home position.

7. In signalling apparatus, in combination, a back casin part having means for the entry thereinto of conductors and a front casing part carrying a movable actuator having an externally accessible element for manually moving it out of and into a home position, a mounting plate carrying signal switch means and a non-interfering switch and a terminal connector block at the rear of the plate for entry into said back casing part, said signal switch means having operating means accesible at the front of said mounting plate, said signal switch means and non-interfering switch being interconnected by wiring to connectors of said terminal block for connection thereto of said conductors, said plate having means for securing it to said back casing part and having means hingedly connecting it to said front casing part for swinging movement of the latter into and out of closing relation to said back casing part, with means for releasably holding said front casing part in closing relation whereby access may be gained to said operating means of said signal switch means, and means operating through an aperture in said mounting plate and carried by said front cover and responsive to swinging movement of the front casing part out of closing relation for actuating said non-interfering switch, said actuator and said signal switch operating means having operating connections, for actuating said switch operating means in signalling direction in response to movement of said actuator out of home position, that are interengageable when said front casing part is swung into closing relation to said back casing part in response to non-signalling position of said operating means and home position of said actuator.

8. In signalling apparatus, in combination, a molded casing-like structure having a wall on which is movably supported an externally accessible manual actuator with switch means responsive to actuation of said manual actuator, said wall having two external aligned bosses integral therewith and molded therein in spaced relation with rearwardly open recesses molded into the respective bosses from the rear of said wall with the recess in one boss intersecting two sides of the boss whereby the latter recess is open-ended at said two sides and the recess in the other boss intersecting that side thereof that faces toward the first-mentioned boss whereby the latter recess is open only at said last mentioned side of the boss, thereby forming two spaced supports for a frangible member that is threaded through that recess that is open-ended in both sides of one boss and is endwise inserted into that recess in the other boss that opens only in the one face thereof, a frangible member so threaded and inserted into said bosses, said manual actuator having means for breaking said frangible member in response to movement out of home position, and blocking means movably carried by said wall and movable relative to said first mentioned boss to close off said open-ended recess therein at the outer side thereof and thereby block said frangible member against withdrawal movement.

9. In signalling apparatus, in combination, a mounting for signaling means comprising a back part and a cover part therefor having means movably mounting it for movement into and out of covering position relative to said back part, with means for releasably holding said cover in covering position, a frangible member carried by said cover at the front thereof, said cover having seat means into which said frangible member is insertable for supporting it from said cover, and means for blocking said frangible member from removal from said seat means comprising a blocking member that is projectable into blocking relation to said seat means and that abuts against said back part and is held against movement out of blocking position when said cover is in covering position relative to said back part.

10. A signalling apparatus as claimed in claim 8 in which said blocking means for preventing said frangible member from withdrawal from said bosses comprises a plate-like member that is enterable into said last mentioned open-ended recess from the rear face of said wall, said wall and said plate-like member having coacting means for slidably guiding and supporting said plate-like member for movement forwardly of said wall to close off said open-ended recess and for movement rearwardly of said wall to un-block said recess for the insertion of a frangible member, said casing-like structure having a back part with means connecting the two for movement of said casing-like structure into and out of covering position relative to the back part, said plate-like member and said back part having coacting parts which, when said casing-like structure is in covering relation to said back part, hold said plate-like member against rearward movement relative to said wall.

11. A signalling apparatus as claimed in claim 10 in which said guiding and supporting means for said plate-like member comprises guideway means in the form of groove means molded into the wall of the recess from the rear of said casing wall, said groove means slidably receiving said plate-like member and extending between the planes of the said two open-ended sides of said boss whereby said plate-like member has to be inserted therein from the rear of said wall and its removal from the front of the wall is prevented.

12. A signalling apparatus as claimed in claim 11 in which said groove means comprises juxtaposed parallel grooves in opposite walls of the recess, said plate-like member having spaced parallel parts respectively enterable into said opposed grooves.

13. A signalling apparatus as claimed in claim 8 in which said casing-like structure is provided with a support to which it is movably connected for movement out of and into closing relation to said support, said blocking means having means movably supporting it from the rear of said wall for movement forwardly of the latter into the recess of said boss to close it off and for movement rearwardly of the wall for movement out of said recess to unblock it for insertion of the frangible member, said blocking means and said support having coacting means to hold the blocking means against rearward movement out of said boss recess when said casing-like structure is in closing relation to said support.

14. In signalling apparatus, in combination, a mounting for signalling switch means and actuating and control means therefor comprising a part adapted to be secured to a support and a cover movably connected thereto for movement into and out of covering position, said cover movably carrying an externally accessible manually-operable actuator that is movable out of and into a home position, a frangible member, said cover having seat means into which said frangible member is insertable for positioning it in relation to said manual actuator, movable means coacting with said seat means for blocking movement of said frangible member out of said seat means, and means forming a connection with said movable means and responsive to movement of said cover into covering position relative to said first mentioned part for positioning said movable means relative to said seat means for blocking movement of said frangible member out of the latter, said cover and said part having releasable means for holding said cover in covering position and for thereby preventing relative movement between said movable means and said seat means in unblocking direction except upon release of said cover for movement out of covering position, said manual actuator having means for breaking said frangible member in response to movement out of home position.

15. In signalling apparatus, in combination, a two-part mounting for signalling switch means and actuating means therefor comprising a part adapted to be secured to a support and a companion part movably connected thereto for movement into and out of covering position, a frangible rod, two spaced aligned holders for supporting said rod at the front of said companion part, said holders having aligned recesses with respective entries into which the ends of said frangible rod are insertably receivable, movable gate-like means for closing off or opening the entry of one of said aligned recesses to respectively hold the rod end received therein against movement out of the recess and to permit insertion of a replacement rod, and means mechanically coacting between said first-mentioned part of said two-part mounting means and with said gate-like means to insure mechanical coincidence of closing-off position of the latter with covering position of said companion part relative to said first-mentioned part.

16. A signalling apparatus as claimed in claim 15 in which said mechanically coacting means comprises an operating member that is operatively connected to said gate-like means and that extends rearwardly of said companion part and toward said first mentioned part of said two-part mounting and operating, when moved toward said companion part, to move said gate-like means into closing-off position and, when moved away from said companion member, to effect withdrawal of said gate-like means from closing off position, said first-mentioned part of said two-part mounting, when said companion part is in covering position, holding said operating member against movement away from said companion part and thereby preventing movement of said gate-like means out of closing-off position.

17. A signalling apparatus as claimed in claim 15 in which said gate-like means, for closing off or opening said entry end of said recess, is movable in directions toward and away from said companion part and said mechanically coacting means comprises an integral extension of said gate-like means in the direction away from said companion part and toward said first-mentioned part of said two-part mounting, said integral extension, when said gate-like means is in closing-off position, abutting against and prevented from retrograde movement by said first-mentioned part when said companion part is in covering position whereby said gate-like means is movable into entry-opening direction only upon moving said companion part out of covering position.

18. In signalling apparatus, in combination, a mounting for signalling means comprising a part adapted to be secured to a support and a cover movably connected thereto for movement into and out of covering position, and a frangible member carried by said cover, said cover having means for releasably supporting said frangible member comprising movable release means operable into and out of release position and having means relating it for mechanical coaction with both said part and said cover, said last-mentioned means operating in response to movement of said cover into covering position and by the resultant relative positions of said part and said cover to mechanically restrict and block said movable release means against movement into release position and operating in response to movement of said cover out of covering position to provide said movable release means with a range of movement sufficient for it to move into release position.

19. In signalling apparatus, in combination, a mounting for signalling means comprising a part carrying signal switch means and adapted to be secured to a support and a cover movably connected thereto for movement into and out of covering position, said signal switch means having an operator selectively movable into and out of signalling and non-signalling positions and said cover movably carrying an externally accessible manually-operable actuator that is movable out of and into a home position, and a frangible member carried by said cover, said actuator having a part engageable with said frangible member to break it upon movement out of home position whereby said actuator has to be in home position for replacement of the frangible member, said cover having means for releasably supporting said frangible member comprising movable means coacting with said part and thereby held against movement in releasing direction when said cover is in covering position and released for movement in releasing direction in response to movement of said cover out of covering position, said actuator and said switch means operator having operating connections for actuating the operator to signalling position in response to movement of the actuator out of home position, said operating connections comprising coacting elements that are disconnectible upon movement of said cover out of covering position whereby said switch means operator may be manually operated and that are operatively re-engageable when a frangible member is present in said supporting means and when said operator is in non-signalling position in response to movement of said cover into covering position.

20. In signalling apparatus, in combination, a mounting for signalling means comprising a part carrying signal switch means and adapted to be secured to a support and a cover movably connected thereto for movement into and out of covering position, said signal switch means having an operator movable into and out of signalling and non-signalling positions, a manually-operable actuator movably carried by said cover for movement relative thereto out of and into a home position, and a frangible member carried by said cover, said actuator having a part adapted to break said frangible member upon movement out of home position, said actuator and said switch means operator having operating connections for actuating the operator to signalling position in response to movement of the actuator out of home position, said operating connections comprising clutch parts respectively associated with said actuator and said operator which are held in operative coupled relation, when said operator is in non-signalling position and said actuator is in home position, by the positioning of said cover in covering relation whereby said operator is moved to and remains in signalling position in response to actuation of said actuator out of home position, the clutch part associated with said actuator moving, in response to opening movement of said cover, away from the other clutch part, with means coacting between said frangible member and said actuator clutch part to position the latter for operative re-association thereof with said other clutch part upon movement of said cover into covering position.

21. In signalling apparatus, in combination, a mounting for signalling means comprising a part carrying signal switch means and adapted to be secured to a support and a cover movably connected thereto for movement into and out of covering position, said signal switch means having an operator movable into and out of signalling and non-signalling positions, a manually-operable actuator movably carried by said cover for movement relative thereto out of and into a home position, and a disconnectible unidirectional driving connection between said actuator and said operator comprising clutch parts respectively associated therewith which are held in operative coupled relation, when said operator is in non-signalling position and said actuator is in home position, by the positioning and holding of said cover in covering position whereby said operator is moved to and remains in signalling position in response to actuation of said actuator out of home position, the clutch part associated with said actuator moving, in response to opening movement of said cover, away from the other clutch part for permitting manual actuation of said signal switch means independently of said actuator.

22. A signalling apparatus as claimed in claim 21 in which said operator comprises a reversibly movable toggle lever which forms one of said clutch parts and the other clutch part comprises means responsive to out-of-home movement of said actuator to tilt said toggle lever from non-signalling to signalling position.

23. A signalling apparatus as claimed in claim 21 in which said operator comprises a reversibly movable toggle lever which forms one of said clutch parts and the other clutch part comprises two spaced elements between which said toggle lever extends when it is in non-signalling position and said actuator is in home position whereby the trailing one of said two spaced elements tilts said toggle lever from non-signalling to signalling position in response to out-of-home movement of said actuator and thereby positions the toggle lever in the path of retrograde movement of the leading one of said spaced elements to block return movement of said actuator to home position.

24. A signalling apparatus as claimed in claim 21 in which said operator comprises a reversibly slidable knob which forms one of said clutch parts and the other clutch part comprises means responsive to out-of-home movement of said actuator to slidably shift said knob from non-signalling to signalling position.

25. A signalling apparatus as claimed in claim 24 in which said operator comprises a reversibly slidable knob which forms one of said clutch parts and the other clutch part comprises two spaced elements between which said knob extends when it is in non-signalling position and said actuator is in home position whereby the trailing one of said two spaced elements slides said knob from non-signalling to signalling position in response to out-of-home movement of said actuator and thereby positions the knob in the path of retrograde movement of the leading one of said spaced elements to block return movement of said actuator to home position.

26. A signalling apparatus as claimed in claim 21 in which said operator comprises a spring-biased plunger having movable means normally holding it in non-signalling position and its associated clutch part is carried by said movable means whereby the latter is moved by said other clutch part in response to out-of-home movement of said actuator to release said plunger for movement into signalling position, with means responsive to actuation of said movable means in plunger-releasing direction to hold said movable means against movement and through the clutch part of the latter hold the actuator clutch part in actuated position.

27. A signalling apparatus as claimed in claim 21 in which said operator comprises a reciprocable plunger having means responsive to its movement into signalling position for holding its associated clutch part against movement and thereby hold the clutch part associated with said actuator against movement.

28. A signalling apparatus as claimed in claim 21 in which said operator comprises a reciprocable plunger, one of said clutch parts having a recess for interengagement upon relative movement therebetween in response to actuation of said actuator out of home position and thereby substantially lock said clutch parts against movement whereby, upon movement of said cover to uncovering position to operatively disassociate said clutch parts, said switch plunger and said holding means therefor may be reset.

29. A signalling apparatus as claimed in claim 21 in which said operator comprises a reciprocable plunger normally spring-biased to signalling position, said clutch parts coacting when said actuator is in home position to hold said plunger in non-signalling position and against its spring-bias whereby, upon actuation of said clutch parts in response to out-of-home movement of said actuator, said plunger is released for movement into signalling position, and means coacting with said plunger when in signalling position to hold said clutch part against reverse actuation, said last-mentioned means being releasable upon subsequent movement of said cover out of covering position and subsequent actuation of the plunger to non-signalling position.

30. A signalling apparatus as claimed in claim 21 in which said operator comprises a rotary member and the clutch part thereof and the clutch parts associated with said actuator are substantially coaxial when said cover is in covering position and the clutch parts are in operative coupled relation, with means responsive to rotational actuation of said rotary member to signalling position by movement of said actuator out of home position for preventing actuation of said rotary member to non-signalling position.

31. A signalling apparatus as claimed in claim 30 in which said last-mentioned responsive means comprises coacting elements of which one is associated with said cover whereby the holding action of said responsive means depends upon whether said cover is in or out of covering position.

32. A signalling apparatus as claimed in claim 21 in which said operator is provided with means releasably holding it in signalling position independently of said driving connection between it and said actuator whereby, after said operator is moved to signalling position in response to out-of-home movement of said actuator, said cover has to be moved out of covering position to gain access to said operator to reset it to non-signalling position.

33. A signalling apparatus as claimed in claim 32 in which said clutch parts are brought into operative coupled relation, upon subsequent movement of the cover to closing position, only when they are in such relative positions as correspond respectively to home position of said actuator and non-signalling position of said operator.

34. A signalling apparatus as claimed in claim 21 in which said operator is provided with means biasing it into non-signalling position whereby, after it is moved to signalling position in response to out-of-home movement of said actuator, it is held in signalling position against its spring-bias by means which release it, for return to non-signalling position, in response to movement of said cover out of covering position.

35. A signalling apparatus as claimed in claim 34 in which said clutch parts are brought into operative coupled relation, upon subsequent movement of the cover to closing position, only when they are in such relative positions as correspond respectively to home position of said actuator and non-signalling position of said operator.

36. A signalling apparatus as claimed in claim 21 in which said operator comprises a reversibly movable toggle lever which forms one of said clutch parts and the other clutch part comprises a driver element that engages said toggle lever to tilt it out of non-signalling position and toward signalling position by movement along a path relative to the path of movement of the lever to by-pass the toggle lever substantially as the latter reaches signalling position whereby the lever remains in signalling position.

37. A signalling apparatus as claimed in claim 21 in which said operator comprises a reversibly movable toggle lever which forms one of said clutch parts and the other clutch part comprises two spaced elements between which said toggle lever extends when it is in non-signalling position and said actuator is in home position whereby the trailing one of said two spaced elements tilts said toggle lever from non-signalling to signalling position in response to out-of-home movement of said actuator and thereby positions the toggle lever in the path of retrograde movement of the leading one of said spaced elements to block return movement of said actuator to home position whereby, upon moving said cover into uncovering position, said toggle lever may be manually moved to non-signalling position and the cover returned to covering position, said trailing element being positioned by the out-of-home position of said actuator to collide, upon closing movement of said cover, with said toggle lever when the latter is in non-signalling position and said leading element being positioned by the in-home position of said actuator to collide with said toggle lever when the latter is in signalling position.

38. In signalling apparatus, in combination, a mounting for signalling means comprising a part adapted to be secured to a support and a cover movably connected thereto for movement into and out of covering position, said part carrying signal switch means having an operator movable out of and into signalling and non-signalling positions and said cover movably carrying a manually-operable actuator that is movable out of and into a home position, said actuator and said opertor having a disconnectible one-way driving connection for actuating said operator to signalling position in response to movement of the actuator out of its home position whereby, upon moving said cover to uncovering position, said operator becomes accessible, said disconnectible driving connection being disconnectible in response to movement of said cover into uncovering position and comprising means positioned in response to home position of the actuator to collide with said operator when the latter is in signalling position and positioned in response to out-of-home position of the actuator to collide with said operator when the latter is in non-signalling position whereby, upon restoring said cover to closing position, said actuator must be restored to home position and said operator restored to non-signalling position.

39. In signalling apparatus, in combination, a mounting for signalling means comprising a part adapted to be secured to a support and a cover movably connected thereto for movement into and out of covering position, said part carrying signal switch means and said cover movably carrying a manually-operable actuator that is movable out of and into a home position, a driver member at the inside of said cover and controlled by said actuator, a driven member associated with said switch means for actuating the latter into and out of signalling and non-signalling conditions, said driving member and said driven member being in driving interengagement when said cover is in covering position for actuating said switch means into signalling condition in response to movement of said actuator out of home position and being disengaged in response to movement of said cover out of covering position whereby, upon moving said cover to uncovering position, said switch means may be manually actuated, and means responsive to actuation of said signal switch means into signalling condition as a result of out-of-home movement of said actuator for causing said signal switch means to remain in signalling condition.

40. In signalling apparatus, in combination, a mounting for signalling means comprising a part adapted to be secured to a support and a cover movably connected thereto for movement into and out of covering position, said part carrying signal switch means and said cover movably carrying a manually-operable actuator that is movable out of and into a home position, releasable locking means for holding said cover in closing position and for releasing it for movement out of closing position, a non-interfering switch electrically interconnected with signalling contacts of said signal switch means and adapted, upon actuation, to inactivate said contacts, said switch means and said actuator having coacting means forming a disconnectible operating connection therebetween that is operatively interconnected or is operatively disconnected according as said cover is moved into or out of covering position whereby, upon movement of said cover out of covering position, said signal switch means is accessible for manual actuation, and means responsive to release of said cover by said locking means for actuating said non-interfering switch to inactivate said contacts of said signal switch means before the latter can be manually actuated and responsive to closing and locking of said cover to inactivate said non-interfering switch.

41. In signalling apparatus, in combination, an enclosing mounting for signalling switch means and actuating and control means therefor comprising a part adapted to be secured to a support and a cover movably connected thereto for movement into and out of covering position, said part carrying signal switch means having an operator selectively movable into and out of signalling and non-signalling positions whereby said signal switch means may be manually operated when said cover is out of covering position and said enclosing mounting movably carrying an externally accessible manually-operable actuator that is movable out of and into a home position and having an externally visible frangible member normally coacting to hold said actuator against movement out of home position and that is broken in response to movement of the actuator out of home position, said actuator and said operator having operating connections for actuating said operator to signalling position in response to movement of the actuator out of home position to break said frangible member and for holding said actuator against movement to home position together with means operating in response to subsequent change of the position of said operator to non-signalling position for freeing said actuator for movement to home position.

References Cited in the file of this patent

UNITED STATES PATENTS 2,594,369 Verkuil et al. ---------- Apr. 29, 1952